(12) United States Patent
Chen et al.

(10) Patent No.: US 10,447,457 B2
(45) Date of Patent: Oct. 15, 2019

(54) REFERENCE SIGNAL PATTERN AND PILOT SHARING FOR SHORTENED TRANSMISSION TIME INTERVAL WIRELESS COMMUNICATIONS

(71) Applicant: QUALCOMM Incorporated, San Diego, CA (US)

(72) Inventors: Wanshi Chen, San Diego, CA (US); Seyedkianoush Hosseini, San Diego, CA (US); Peter Gaal, San Diego, CA (US); Jing Sun, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 15/648,159

(22) Filed: Jul. 12, 2017

(65) Prior Publication Data
US 2018/0131498 A1    May 10, 2018

Related U.S. Application Data

(60) Provisional application No. 62/419,730, filed on Nov. 9, 2016.

(51) Int. Cl.
*H04L 5/00* (2006.01)
*H04L 27/26* (2006.01)

(52) U.S. Cl.
CPC ............ *H04L 5/0082* (2013.01); *H04L 5/005* (2013.01); *H04L 5/0007* (2013.01);
(Continued)

(58) Field of Classification Search
CPC .. H04L 5/005; H04W 72/02; H04W 72/0413; H04W 72/042; H04W 72/14
See application file for complete search history.

(56) References Cited

U.S. PATENT DOCUMENTS

| 2001/0001609 A1* | 5/2001 | Mikuni | H04W 16/10 370/337 |
| 2010/0069028 A1* | 3/2010 | Choi | H04B 7/0602 455/136 |

(Continued)

FOREIGN PATENT DOCUMENTS

| WO | WO2017008840 A1 | 1/2017 |
| WO | WO2017056020 A1 | 4/2017 |

OTHER PUBLICATIONS

Catt, "Discussion on DMRS Design for sPUSCH," 3GPP TSG RAN WG1 Meeting #87, R1-1611358, Reno, USA, Nov. 14-18, 2016, 8 pgs., XP051189892, 3rd Generation Partnership Project.
(Continued)

*Primary Examiner* — Ayaz R Sheikh
*Assistant Examiner* — Debebe A Asefa
(74) *Attorney, Agent, or Firm* — Holand & Hart LLP/Qualcomm

(57) ABSTRACT

Methods, systems, and devices for wireless communication are described that provide for identifying uplink transmissions that are to be made using shortened transmission time intervals (sTTIs), and allocating uplink resources for such transmissions. A portion of the uplink resources may be reserved for reference signal transmissions, such as demodulation reference signal (DMRS) transmissions. Resources for a number of sTTIs may be aligned within a slot that comprises a number of orthogonal frequency division multiplexing (OFDM) symbols, and one of the OFDM symbols may have resources reserved that are to be shared by two or more sTTIs within the slot for DMRS transmission. The reserved OFDM symbol may be shared by two overlapping sTTIs in which the reserved OFDM symbol is common between the two sTTIs. A DMRS sequence for each sTTI
(Continued)

may be selected based on the allocated uplink resources for the sTTIs.

30 Claims, 24 Drawing Sheets

(52) U.S. Cl.
CPC .......... *H04L 5/0044* (2013.01); *H04L 5/0051* (2013.01); *H04L 5/0092* (2013.01); *H04L 27/2613* (2013.01)

(56) References Cited

U.S. PATENT DOCUMENTS

2016/0095104 A1  3/2016  Chen et al.
2016/0353436 A1  12/2016 Au et al.
2017/0111894 A1  4/2017  Chen et al.
2017/0171842 A1* 6/2017  You .................. H04L 5/0048

OTHER PUBLICATIONS

ISA/EP, International Search Report and Written Opinion of the International Searching Authority, Int'l Application No. PCT/US2017/055695, dated Jan. 11, 2018, European Patent Office, Rijswijk, NL, 16 pgs.
NTT DOCOMO, Inc., "sPUSCH for Shortened TTI," 3GPP TSG RAN WG1 Meeting #87, R1-1612697, Reno, USA, Nov. 14-18, 2016, 7 pgs., XP051190523, 3rd Generation Partnership Project.
Qualcomm Incorporated, "UL Design for Shortened TTI," 3GPP TSG RAN WG1 Meeting #86b, R2-1610008, Lisbon, Portugal, Oct. 10-14, 2016, 7 pgs., XP051150033, 3rd Generation Partnership Project.

* cited by examiner

REFERENCE SIGNAL PATTERN AND PILOT SHARING FOR SHORTENED TRANSMISSION TIME INTERVAL WIRELESS COMMUNICATIONS

CROSS REFERENCES

The present application for patent claims priority to U.S. Provisional Patent Application No. 62/419,730, entitled "Reference Signal Pattern and Pilot Sharing For Shortened Transmission Time Interval Wireless Communications," filed Nov. 9, 2016, assigned to the assignee hereof.

BACKGROUND

The following relates generally to wireless communication, and more specifically to reference signal pattern and pilot sharing for shortened transmission time interval wireless communications.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some examples, a wireless multiple-access communication system may include a number of base stations, each simultaneously supporting communication for multiple communication devices, otherwise known as user equipment (UEs). In a LTE or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

A base station in some LTE or NR deployments may transmit to one or more UEs using multiple different transmission time intervals (TTIs) that may include a shortened TTI (sTTI) that has a reduced length relative to a 1 millisecond (1 ms) or legacy LTE TTI. Users communicating using sTTIs may be referred to as low latency users. An sTTI may be a subset of one or more subframes that correspond to 1 ms or legacy TTI subframes. A base station may allocate transmission resources for sTTIs to a UE that may include time and/or frequency resources. Efficient allocation of such resources for data, control information, and reference signal transmissions may help to increase the efficiency of a wireless communications system.

SUMMARY

The described techniques relate to improved methods, systems, devices, or apparatuses that support reference signal pattern and pilot sharing for shortened transmission time interval (sTTI) wireless communications. Generally, the described techniques provide for identifying uplink transmissions that are to be made using sTTIs (e.g., low latency or high reliability transmissions), and allocating uplink resources for such transmissions. A portion of the uplink resources may be reserved for reference signal transmissions, such as demodulation reference signal (DMRS) transmissions. In some examples, resources for a number of sTTIs may be aligned within a slot that comprises a number of orthogonal frequency division multiplexing (OFDM) symbols, and one of the OFDM symbols may have resources reserved that are to be shared by two or more sTTIs within the slot for DMRS transmission. The reserved OFDM symbol may, in some cases, be shared by two overlapping sTTIs in which the reserved OFDM symbol is common between the two sTTIs. In some cases, the reserved OFDM symbol may also be used for DMRS transmissions for a non-adjacent sTTI, and signaling may be provided to indicate the DMRS resource for the non-adjacent sTTI. A DMRS sequence for each sTTI may be selected based on the allocated uplink resources for the sTTIs.

A method of wireless communication is described. The method may include allocating uplink resources for at least a first TTI and a second TTI within a slot that comprises a plurality of OFDM symbols, reserving a subset of reserved uplink resources of a first OFDM symbol within the slot to be shared by the first TTI and the second TTI for transmission of a DMRS, the first OFDM symbol located adjacent to or within the first TTI and the second TTI, and transmitting an uplink grant for an uplink transmission to a UE, the uplink grant including an indication of the allocated uplink resources.

An apparatus for wireless communication is described. The apparatus may include means for allocating uplink resources for at least a first TTI and a second TTI within a slot that comprises a plurality of OFDM symbols, means for reserving a subset of reserved uplink resources of a first OFDM symbol within the slot to be shared by the first TTI and the second TTI for transmission of a DMRS, the first OFDM symbol located adjacent to or within the first TTI and the second TTI, and means for transmitting an uplink grant for an uplink transmission to a UE, the uplink grant including an indication of the allocated uplink resources.

Another apparatus for wireless communication is described. The apparatus may include a processor, memory in electronic communication with the processor, and instructions stored in the memory. The instructions may be operable, when executed by the processor, to cause the apparatus to allocate uplink resources for at least a first TTI and a second TTI within a slot that comprises a plurality of OFDM symbols, reserve a subset of reserved uplink resources of a first OFDM symbol within the slot to be shared by the first TTI and the second TTI for transmission of a DMRS, the first OFDM symbol located adjacent to or within the first TTI and the second TTI, and transmit an uplink grant for an uplink transmission to a UE, the uplink grant including an indication of the allocated uplink resources.

A non-transitory computer readable medium for wireless communication is described. The non-transitory computer-readable medium may include instructions operable to cause a processor to allocate uplink resources for at least a first TTI and a second TTI within a slot that comprises a plurality of OFDM symbols, reserve a subset of reserved uplink resources of a first OFDM symbol within the slot to be shared by the first TTI and the second TTI for transmission of a DMRS, the first OFDM symbol located adjacent to or within the first TTI and the second TTI, and transmit an uplink grant for an uplink transmission to a UE, the uplink grant including an indication of the allocated uplink resources.

Some examples of the method, apparatus, and non-transitory computer-readable medium described above may further include processes, features, means, or instructions for identifying that the first TTI and the second TTI comprise a same set of frequency resources, configuring a first DMRS sequence for the first TTI based on a first cyclic shift (CS) of a base DMRS sequence, and configuring a second DMRS sequence for the second TTI based on a second CS of the base DMRS sequence, the first DMRS sequence and the second DMRS sequence having a same length.

Some examples of the method, apparatus, and non-transitory computer-readable medium described above may further include processes, features, means, or instructions for identifying that the first TTI comprises a first set of frequency resources and that the second TTI comprises second set of frequency resources that may be adjacent to the first set of frequency resources. Some examples of the method, apparatus, and non-transitory computer-readable medium described above may further include processes, features, means, or instructions for configuring a first DMRS sequence for the first TTI having a first sequence length that corresponds to the first set of frequency resources, and configuring, independently of the first DMRS sequence, a second DMRS sequence for the second TTI having a second sequence length that corresponds to the second set of frequency resources. Some examples of the method, apparatus, and non-transitory computer-readable medium described above may further include processes, features, means, or instructions for configuring a first DMRS sequence for the first TTI having a first sequence length that spans both the first set of frequency resources and the second set of frequency resources, and configuring a second DMRS sequence for the second TTI having a second sequence length that spans both the first set of frequency resources and the second set of frequency resources.

Some examples of the method, apparatus, and non-transitory computer-readable medium described above may further include processes, features, means, or instructions for identifying that the first TTI comprises a first set of frequency resources and that the second TTI comprises second set of frequency resources that may be a subset of the first set of frequency resources. Some examples of the method, apparatus, and non-transitory computer-readable medium described above may further include processes, features, means, or instructions for configuring a first interlace within the first set of frequency resources for transmission of a first DMRS sequence for the first TTI, the first DMRS sequence having a first sequence length that corresponds to the first set of frequency resources, and configuring a second interlace within the subset of the first set of frequency resources for transmission of a second DMRS sequence for the second TTI, the second DMRS sequence having a second sequence length that corresponds to the second set of frequency resources. Some examples of the method, apparatus, and non-transitory computer-readable medium described above may further include processes, features, means, or instructions for identifying that the first TTI comprises a first set of frequency resources and that the second TTI comprises second set of frequency resources that partially overlaps the first set of frequency resources.

Some examples of the method, apparatus, and non-transitory computer-readable medium described above may further include processes, features, means, or instructions for configuring a first interlace within the first set of frequency resources and the second set of frequency resources for transmission of a first DMRS sequence for the first TTI, and configuring a second interlace within the first set of frequency resources and the second set of frequency resources for transmission of a second DMRS sequence for the second TTI. Some examples of the method, apparatus, and non-transitory computer-readable medium described above may further include processes, features, means, or instructions for identifying that the first TTI comprises a first set of frequency resources and that the second TTI comprises second set of frequency resources that may be non-adjacent to and non-overlapping with the first set of frequency resources. Some examples of the method, apparatus, and non-transitory computer-readable medium described above may further include processes, features, means, or instructions for configuring a first DMRS sequence for the first TTI having a first sequence length that corresponds to the first set of frequency resources, and configuring, independently of the first DMRS sequence, a second DMRS sequence for the second TTI having a second sequence length that corresponds to the second set of frequency resources that may be non-adjacent to and non-overlapping with the first set of frequency resources.

Some examples of the method, apparatus, and non-transitory computer-readable medium described above may further include processes, features, means, or instructions for identifying that the first TTI may have three OFDM symbols and the second TTI may have three OFDM symbols, and wherein the first OFDM symbol may be shared between the first TTI and the second TTI. Some examples of the method, apparatus, and non-transitory computer-readable medium described above may further include processes, features, means, or instructions for configuring one or more of the first TTI or the second TTI to have, in addition to the first OFDM symbol, two data OFDM symbols or one data OFDM symbol and one pilot OFDM symbol.

In some examples of the method, apparatus, and non-transitory computer-readable medium described above, the allocated uplink resources include resources for a third TTI that includes two OFDM symbols that may be non-adjacent to the first OFDM symbol, and a DMRS resource may be identified for the third TTI. In some examples of the method, apparatus, and non-transitory computer-readable medium described above, each of the two OFDM symbols of the third TTI may be data OFDM symbols, and wherein the DMRS resource for the third TTI comprises a resource located within the first OFDM symbol. Some examples of the method, apparatus, and non-transitory computer-readable medium described above may further include processes, features, means, or instructions for transmitting signaling indicating the DMRS resource for the third TTI. In some examples of the method, apparatus, and non-transitory computer-readable medium described above, the DMRS resource for the third TTI may be located two or more OFDM symbols after the signaling indicating the DMRS resource for the third TTI. In some examples of the method, apparatus, and non-transitory computer-readable medium described above, the DMRS resource may be included in pilot signal resources within one of the two OFDM symbols of the third TTI.

A method of wireless communication is described. The method may include receiving an allocation of uplink resources from a base station for at least a first TTI and a second TTI within a slot that comprises a plurality of OFDM symbols, identifying reserved uplink resources of a first OFDM symbol within the slot to be shared by the first TTI and the second TTI for transmission of a DMRS, the first OFDM symbol located adjacent to or within the first TTI and the second TTI, and transmitting an uplink transmission and DMRS to the base station using the allocated uplink resources and the reserved uplink resources.

An apparatus for wireless communication is described. The apparatus may include means for receiving an allocation of uplink resources from a base station for at least a first TTI and a second TTI within a slot that comprises a plurality of OFDM symbols, means for identifying reserved uplink resources of a first OFDM symbol within the slot to be shared by the first TTI and the second TTI for transmission of a DMRS, the first OFDM symbol located adjacent to or within the first TTI and the second TTI, and means for transmitting an uplink transmission and DMRS to the base station using the allocated uplink resources and the reserved uplink resources.

Another apparatus for wireless communication is described. The apparatus may include a processor, memory in electronic communication with the processor, and instructions stored in the memory. The instructions may be operable, when executed by the processor, to cause the apparatus to receive an allocation of uplink resources from a base station for at least a first TTI and a second TTI within a slot that comprises a plurality of OFDM symbols, identify reserved uplink resources of a first OFDM symbol within the slot to be shared by the first TTI and the second TTI for transmission of a DMRS, the first OFDM symbol located adjacent to or within the first TTI and the second TTI, and transmit an uplink transmission and DMRS to the base station using the allocated uplink resources and the reserved uplink resources.

A non-transitory computer readable medium for wireless communication is described. The non-transitory computer-readable medium may include instructions operable to cause a processor to receive an allocation of uplink resources from a base station for at least a first TTI and a second TTI within a slot that comprises a plurality of OFDM symbols, identify reserved uplink resources of a first OFDM symbol within the slot to be shared by the first TTI and the second TTI for transmission of a DMRS, the first OFDM symbol located adjacent to or within the first TTI and the second TTI, and transmit an uplink transmission and DMRS to the base station using the allocated uplink resources and the reserved uplink resources.

Some examples of the method, apparatus, and non-transitory computer-readable medium described above may further include processes, features, means, or instructions for identifying that the first TTI and the second TTI comprise a same set of frequency resources, generating a first DMRS sequence for the first TTI based on a first cyclic shift (CS) of a base DMRS sequence, generating a second DMRS sequence for the second TTI based on a second CS of the base DMRS sequence, the first DMRS sequence and the second DMRS sequence having a same length, and transmitting the first DMRS sequence and the second DMRS sequence in the first OFDM symbol.

Some examples of the method, apparatus, and non-transitory computer-readable medium described above may further include processes, features, means, or instructions for identifying that the first TTI comprises a first set of frequency resources and that the second TTI comprises second set of frequency resources that may be adjacent to the first set of frequency resources. Some examples of the method, apparatus, and non-transitory computer-readable medium described above may further include processes, features, means, or instructions for generating a first DMRS sequence for the first TTI having a first sequence length that corresponds to the first set of frequency resources, generating, independently of the first DMRS sequence, a second DMRS sequence for the second TTI having a second sequence length that corresponds to the second set of frequency resources, and transmitting the first DMRS sequence and the second DMRS sequence in the first OFDM symbol. Some examples of the method, apparatus, and non-transitory computer-readable medium described above may further include processes, features, means, or instructions for generating a first DMRS sequence for the first TTI having a first sequence length that spans both the first set of frequency resources and the second set of frequency resources, generating a second DMRS sequence for the second TTI having a second sequence length that spans both the first set of frequency resources and the second set of frequency resources, and transmitting the first DMRS sequence and the second DMRS sequence in the first OFDM symbol.

Some examples of the method, apparatus, and non-transitory computer-readable medium described above may further include processes, features, means, or instructions for identifying that the first TTI comprises a first set of frequency resources and that the second TTI comprises second set of frequency resources that may be a subset of the first set of frequency resources. Some examples of the method, apparatus, and non-transitory computer-readable medium described above may further include processes, features, means, or instructions for configuring a first interlace within the first set of frequency resources for transmission of a first DMRS sequence for the first TTI, generating the first DMRS sequence having a first sequence length that corresponds to the first set of frequency resources, configuring a second interlace within the subset of the first set of frequency resources for transmission of a second DMRS sequence for the second TTI, generating the second DMRS sequence having a second sequence length that corresponds to the second set of frequency resources, and transmitting the first DMRS sequence in the first interlace and the second DMRS sequence in the second interlace.

Some examples of the method, apparatus, and non-transitory computer-readable medium described above may further include processes, features, means, or instructions for identifying that the first TTI comprises a first set of frequency resources and that the second TTI comprised second set of frequency resources that may be non-adjacent to and non-overlapping with the first set of frequency resources. Some examples of the method, apparatus, and non-transitory computer-readable medium described above may further include processes, features, means, or instructions for generating a first DMRS sequence for the first TTI having a first sequence length that corresponds to the first set of frequency resources, generating, independently of the first DMRS sequence, a second DMRS sequence for the second TTI having a second sequence length that corresponds to the second set of frequency resources that may be non-adjacent to and non-overlapping with the first set of frequency resources, and transmitting the first DMRS sequence in the first set of frequency resources and the second DMRS sequence in the second set of frequency resources.

Some examples of the method, apparatus, and non-transitory computer-readable medium described above may further include processes, features, means, or instructions for identifying that the first TTI that may have three OFDM symbols and the second TTI that may have three OFDM symbols, and wherein the first OFDM symbol may be shared between the first TTI and the second TTI. In some examples of the method, apparatus, and non-transitory computer-readable medium described above, one or more of the first TTI or the second TTI includes, in addition to the first OFDM symbol, two data OFDM symbols or one data OFDM symbol and one pilot OFDM symbol. In some examples of the method, apparatus, and non-transitory computer-readable medium described above, the allocation of uplink resources further comprises uplink resources for a third TTI that includes two OFDM symbols that may be non-adjacent to the first OFDM symbol. Some examples of the method, apparatus, and non-transitory computer-readable medium described above may further include processes, features, means, or instructions for receiving signaling indicating a DMRS resource for the third TTI.

DETAILED DESCRIPTION

Figure 1:
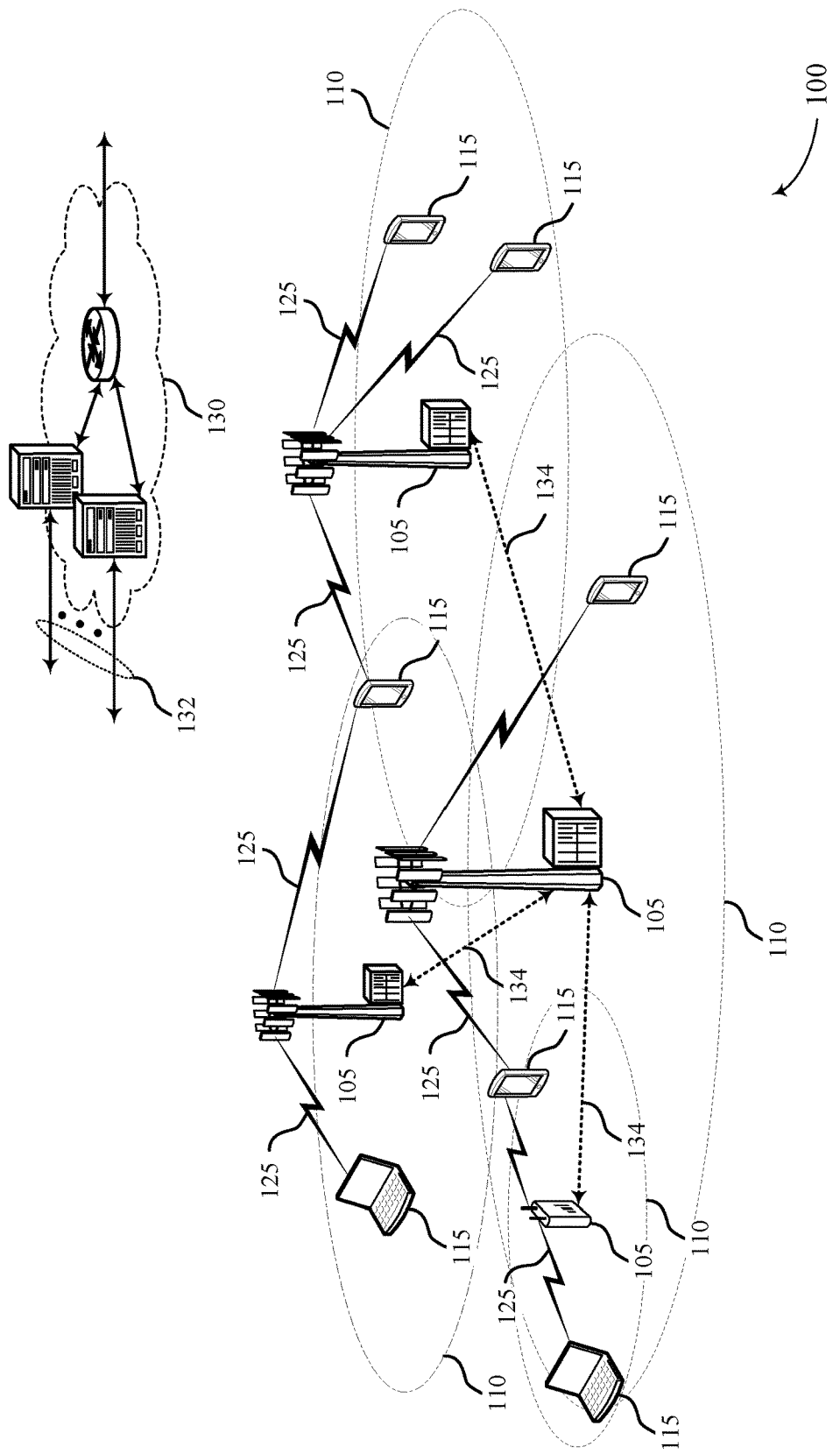
FIG. 1 illustrates an example of a system for wireless communication that supports reference signal pattern and pilot sharing for shortened transmission time interval wireless communications in accordance with aspects of the present disclosure.

Improved methods, systems, devices, or apparatuses of various examples may be used to support reference signal pattern and pilot sharing for shortened transmission time interval (sTTI) communications in low latency wireless communications systems. Resources allocated for low latency communication may be used for uplink and downlink communication using sTTIs that have a reduced length relative to TTIs of communications that may be relatively latency insensitive, such as enhanced mobile broadband (eMBB) transmissions that may use a 1 ms TTI duration. Communications using sTTIs may use, in some cases, a sTTI duration that corresponds to one slot of a wireless subframe, or a sTTI duration that corresponds to two or three orthogonal frequency division multiplexing (OFDM) symbols. In some cases, sTTIs may be configured to have boundaries within or aligned with boundaries of a slot of a 1 ms TTI. In some examples, the sTTIs may span two or three OFDM symbols, and each slot may have three sTTIs. In such a manner, all seven symbols of a slot using a normal cyclic prefix may be utilized and system resources may be more efficiently utilized relative to a case where three two-symbol sTTIs would be included in a seven-symbol slot.

Various techniques as disclosed herein may provide for identifying uplink resources for sTTI transmissions. A portion of the uplink resources may be reserved for reference signal transmissions, such as DMRS transmissions. In some examples, resources for a number of sTTIs may be aligned within a slot that comprises a number of OFDM symbols, and one of the OFDM symbols may have resources reserved that are to be shared by two or more sTTIs within the slot for DMRS transmission. The reserved OFDM symbol may, in some cases, be shared by two overlapping sTTIs in which the reserved OFDM symbol is common between the two sTTIs. In some cases, the reserved OFDM symbol may also be used for DMRS transmissions for a non-adjacent sTTI, and signaling may be provided to indicate the DMRS resource for the non-adjacent sTTI. A DMRS sequence for each sTTI may be selected based on the allocated uplink resources for the sTTIs.

The UE may receive an uplink resource allocation for two or more sTTIs within a slot, and may transmit uplink communications using the allocated uplink resources. The reference signal configuration, such as a DMRS configuration, may be identified, and DMRS for two or more of the sTTIs transmitted using the reserved resources. In some cases, reference signals from two or more sTTIs may be multiplexed (e.g., by applying different cyclic shifts or by using different interlaces) and transmitted using reference signal resources for a sTTI.

Such low latency communications may be used in system, for example, that may support multiple different services for data communications that may be selected depending upon the nature of the communications. For example, communications that require low latency and high reliability, sometimes referred to as mission critical (MiCr) communications, may be served through a lower-latency service (e.g., an ultra-reliable low-latency communication (URLLC) service) that uses sTTIs. Correspondingly, communications that are more delay-tolerant may be served through a service that provides relatively higher throughput with somewhat higher latency, such as a mobile broadband service (e.g., an enhanced mobile broadband (eMBB) service) that uses 1 ms TTIs. In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different subcarrier (or tone) spacing and different cyclic prefixes.

The present disclosure describes various techniques with reference to next generation networks (e.g., 5G or NR networks) that are being designed to support features such as high bandwidth operations, more dynamic subframe/slot types, and self-contained subframe/slot types (in which hybrid automatic repeat request (HARM) feedback for a subframe/slot may be transmitted before the end of the subframe/slot). However, such techniques may be used for any system in which TTIs of different lengths may be transmitted in a wireless communications system.

Aspects of the disclosure are initially described in the context of a wireless communications system. Various examples of DMRS configurations for different sTTI resources are then discussed. Aspects of the disclosure are further illustrated by and described with reference to apparatus diagrams, system diagrams, and flowcharts that relate to reference signal pattern and pilot sharing for shortened transmission time interval wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (e.g., mission critical) communications, low latency communications, and communications with low-cost and low-complexity devices. Wireless communications system 100 may provide for reference signal pattern and pilot sharing for sTTI wireless communications, in which reserved resources may be shared by two or more sTTIs for reference signal or pilot transmissions.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, a drone, or the like.

In some cases, a UE 115 may also be able to communicate directly with other UEs (e.g., using a peer-to-peer (P2P) or device-to-device (D2D) protocol). Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable and low latency communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may be an example of a LTE eNB, an eLTE eNB, an NR gNB, an NR Node-B, an NR access node, and may include an access node controller (ANC).

A base station 105 may interface with the core network 130 through backhaul links 132 (e.g., S1, S2, NG-1, NG-2, NG-3, NG-C, NG-U etc.) and may perform radio configuration and scheduling for communication with the UEs 115 within an associated coverage area 110. In various examples, the network devices 105-$b$ may communicate, either directly or indirectly (e.g., through core network 130), with each other over backhaul links 134 (e.g., X1, X2, Xn etc.), which may be wired or wireless communication links. Each base station 105 may also communicate with a number of UEs 115 through a number of other network devices, where a network device may be an example of a transmission reception point (TRP), a distributed unit (DU), a radio head (RH), a remote radio head (RRH), or a smart radio head.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, and shorter transmission time interval (TTIs). In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. A 5G or NR carrier may be considered an eCC.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Time intervals in LTE or NR may be expressed in multiples of a basic time unit (which may be a sampling period of $T_s=1/30,720,000$ seconds). Time resources in LTE/LTE-A may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, also known as a TTI. In other cases, a TTI may be shorter than a subframe or may be dynamically selected (e.g., in sTTI bursts or in selected component carriers using sTTIs). Various examples discussed herein provide techniques for shortened TTIs, which may provide reference signal resources that may be shared by two or more sTTIs and that may be used to provide reliable DMRS transmissions for use in demodulating sTTI uplink transmissions from a UE 115.

Figure 2:
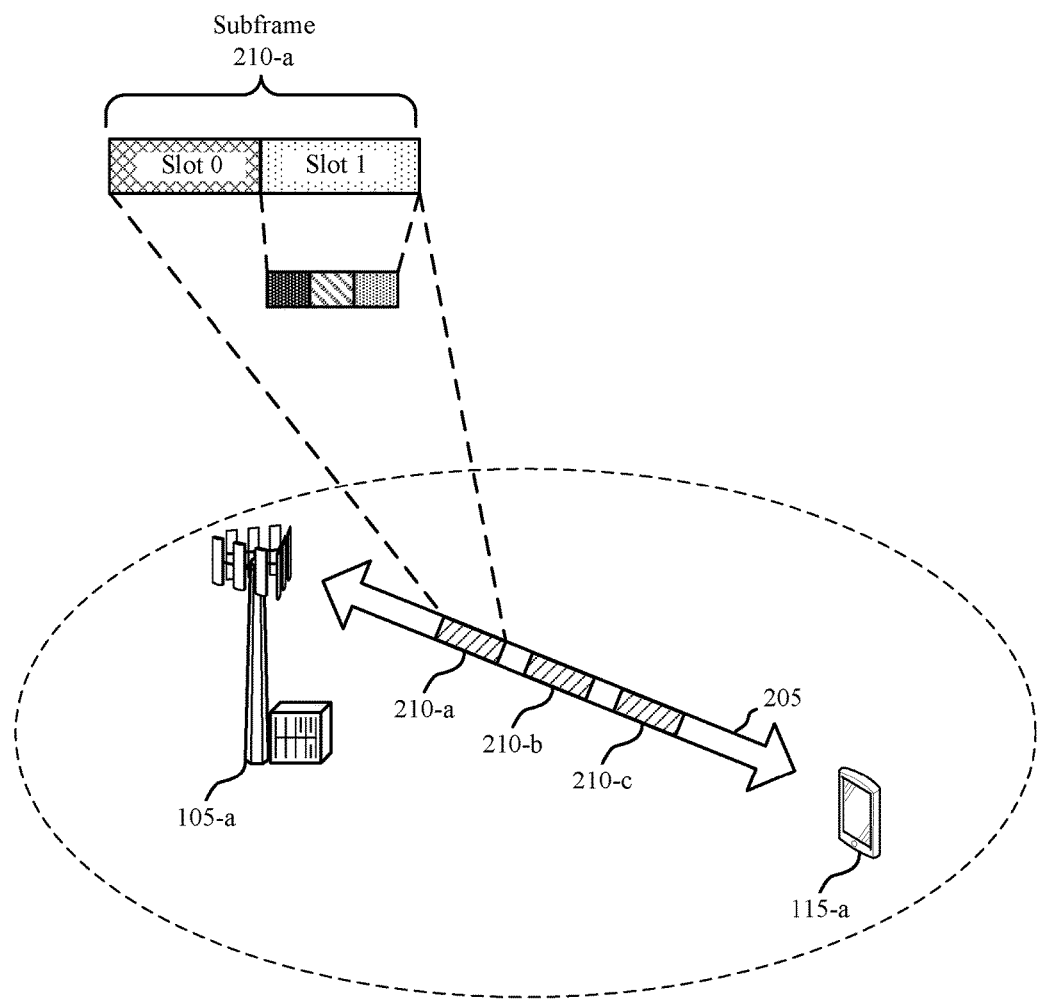
FIG. 2 illustrates an example of a wireless communications system that supports reference signal pattern and pilot sharing for shortened transmission time interval wireless communications in accordance with aspects of the present disclosure.
Figure 2:

FIG. 2 illustrates an example of a wireless communications system 200 for reference signal pattern and pilot sharing for shortened transmission time interval wireless communications. Wireless communications system 200 includes base station 105-a and UE 115-a, which may be examples of aspects of a UE 115 as described above with reference to FIG. 1. In the example of FIG. 2, the wireless communications system 200 may operate according to a radio access technology (RAT) such as a 5G or NR RAT, although techniques described herein may be applied to any RAT and to systems that may concurrently use two or more different RATs.

Base station 105-a may communicate with UE 115-a over carrier 205. In some examples, base station 105-a may allocate resources for communication with UEs over carrier 205. For example, base station 105-a may allocate subframes 210 for communication with UE 115-a, and one or more subframes 210 may correspond to a legacy LTE TTI of 1 ms. In this example, subframes 210 may include a first subframe 210-a, a second subframe 210-b, and a third subframe 210-c. Each of the subframes 210 may include two slots, in which each slot may have seven symbols for a normal cyclic prefix. In this example, a first slot (slot 0) 220 and a second slot (slot 1) 225 may be included in the first subframe 210-a.

As indicated above, in the uplink of a low latency system, different sTTI lengths may be used for transmissions over carrier 205. For example, two-symbol sTTI, three-symbol sTTI, and 1-slot sTTI durations may be supported for physical uplink control channel (PUCCH) and physical uplink shared channel (PUSCH) transmissions (or shortened PUCCH (sPUCCH) and shortened PUSCH (sPUSCH) transmissions). Thus, within first slot 220 or second slot 225, there may be multiple sTTIs, such as a first sTTI (TTI-0) 230, a second sTTI (TTI-1) 235, and a third sTTI (TTI-2) 240, that may each have a two or three OFDM symbol duration. While various examples discussed herein are described with respect to uplink communications, such techniques may also apply to downlink communications in some examples.

When two-symbol or three-symbol sTTI is used, in some cases it may be desirable to have a fixed sTTI structure in which sTTI boundaries lie within slot boundaries or are aligned with slot boundaries, such as the boundaries of the first slot 220 or second slot 225, which may be referred to as slot-aligned sTTIs. As discussed above, when using a normal CP, seven symbols are included in each slot 220-225, and thus each slot may include three sTTIs for slot-aligned sTTIs. As the TTI length gets shorter, it may not always be possible to reuse the legacy DMRS pattern, as a particular sTTI may not include a legacy DMRS symbols (symbol 3 of each slot). For example, a 2-symbol sPUSCH covering symbols 0 and 1 of a subframe does not include a legacy DMRS symbol. In such cases, providing a separate DMRS resource for each sTTI may result in relatively high overhead. According to various aspects of the present disclosure, two of the sTTIs within a slot may be configured as three-symbol sTTIs that share a common symbol that may be used for DMRS or pilot signal transmissions for each of sTTIs, so as to efficiently utilize each symbol of each slot.

Figure 3:
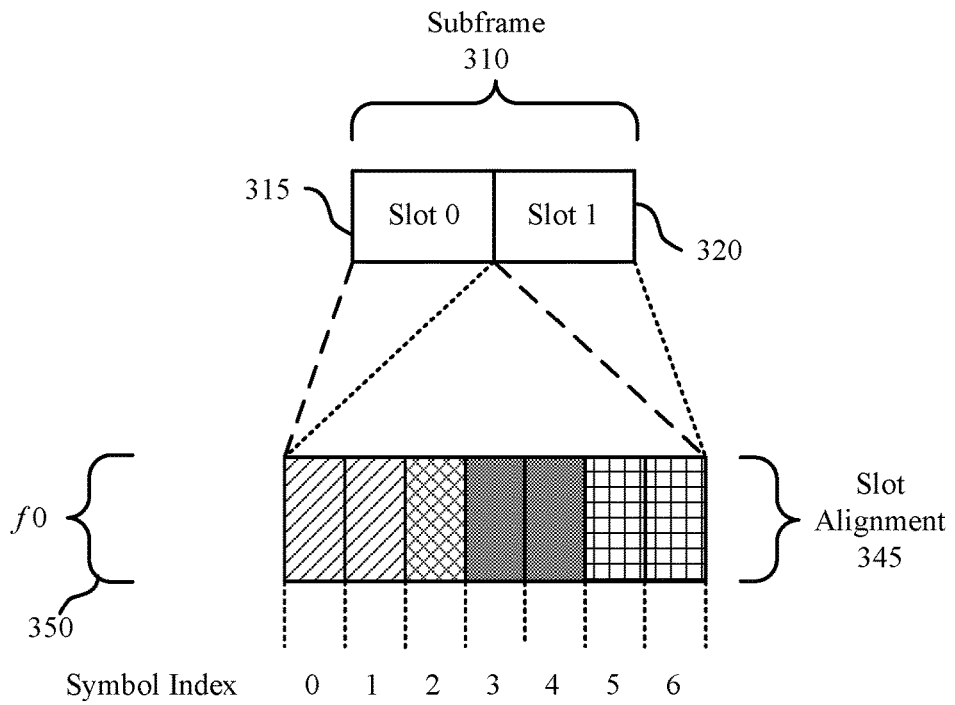
FIG. 3 illustrates an example of sTTI resources that support reference signal pattern and pilot sharing for shortened transmission time interval wireless communications in accordance with aspects of the present disclosure.
Figure 3:
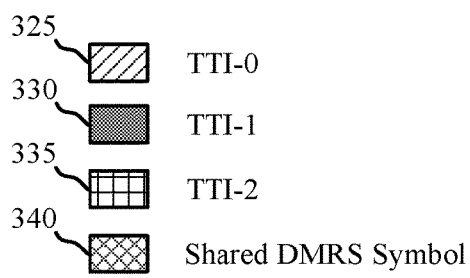

FIG. 3 illustrates an example of sTTI resources 300 for reference signal pattern and pilot sharing for shortened transmission time interval wireless communications. The sTTI resources 300 may be used, for example, in slot-aligned sTTI patterns for low latency communications between a UE and a base station such as discussed above with respect to FIGS. 1 and 2. A subframe 310 may have resources allocated for uplink communication. Subframe 310 may include two slots: first slot (slot 0) 315 and second slot (slot 1) 320 that may correspond to 1 ms or legacy LTE TTI slots. Each slot 315 and 320 may include slot-aligned sTTIs allocated for low latency communication according to a slot alignment 345. Each slot 315 and 320 may include three sTTIs, including a first TTI (TTI-0) 325, a second TTI (TTI-1) 330, and a third TTI (TTI-2) 335.

As can be seen from above, in order to make sure that the sTTIs do not cross the slot boundary within the 1 ms subframe 310, both 2-symbol and 3-symbol sTTIs may be used within slot 315 or slot 320. In various examples, one OFDM symbol may be reserved for DMRS transmissions and may be a shared DMRS symbol 340 that is shared between the first sTTI 325 and the second sTTI 330. Thus, in such cases both the first sTTI 325 and the second sTTI 330 may include two symbols for data transmissions, and transmit a DMRS in shared DMRS symbol 340. Thus, each of the first two sTTIs in this example effectively become a three-symbol sTTI with the shared DMRS symbol 340 common between them.

As shown in the example of FIG. 3, symbol two may be reserved for DMRS transmission. In some cases, symbol two of the first slot 315 may always be reserved for DMRS transmission and an uplink resource allocation to a UE that includes allocated resources in the first sTTI 325 or the second sTTI 330 may be assumed to include resources for DMRS transmission in the shared DMRS symbol 340, and thus, within the slot, the first two sTTIs can always share their DMRSs. Within the first sTTI 325 and the second sTTI 330, the other two symbols can be configured to transmit data in each symbol, or data in one symbol and a pilot signal in the other symbol. In some cases, a base station may configure a data/pilot configuration for a sTTI when a UE is identified as having relatively high mobility. The third sTTI 335 also may be configured as either data/data or pilot/data. In cases where the third sTTI 335 is data/data, then an associated DMRS may be transmitted before the start of the third sTTI 335. In some cases, the timing for such a third sTTI 335 DMRS transmission may be based on n+k, where n is a symbol in which the UE receives the grant and k is the symbol in which the associated DMRS is to be transmitted. In some cases, k may be selected to be k≥2. In other cases, k may be selected to be k≥4.

In some situations, the second slot 320 may include a sounding reference signal (SRS) transmission at the last symbol of the slot, and in such cases is may be beneficial to have the last sTTI of the second slot 320 be a three-symbol sTTI, where the third symbol of the sTTI is used for the SRS transmission and the other two symbols may be used for data and/or pilot transmissions. Thus, in some examples, it may be standardized that symbol two of a first slot may be reserved for DMRS transmissions. Thus, if a resource allocation includes a sTTI that includes or is adjacent to symbol two, then symbol two is to be used for DMRS transmission. In other cases, where allocated resources do not include resources that include or are adjacent to symbol two of the first slot, the DMRS resource may be indicated in an uplink grant similarly is discussed with the third sTTI 335 above.

The allocated uplink resources for two or more sTTIs may include the same or different frequency resources for each sTTI. In the example of FIG. 3, each of the sTTIs may be allocated resources in frequency resources f0 350. In other cases, the frequency resources may occupy a set of disjoint, but consecutive resources, the frequency resources of one sTTI may be a superset of the frequency resources of another sTTI, or the frequency resources may be non-overlapping and non-adjacent in frequency. DMRS sequences for DMRS transmissions using the shared DMRS symbol 340 may be identified based on the frequency resources for the sTTIs, according to various examples. In the case where the same frequency resources are used for both the first sTTI 325 and the second sTTI 330, DMRS transmissions may be multiplexed different cyclic shifts of the same length. Other cases of non-identical frequency resources and associated DMRS sequences are discussed with reference to FIGS. 4 and 5.

Figure 4:
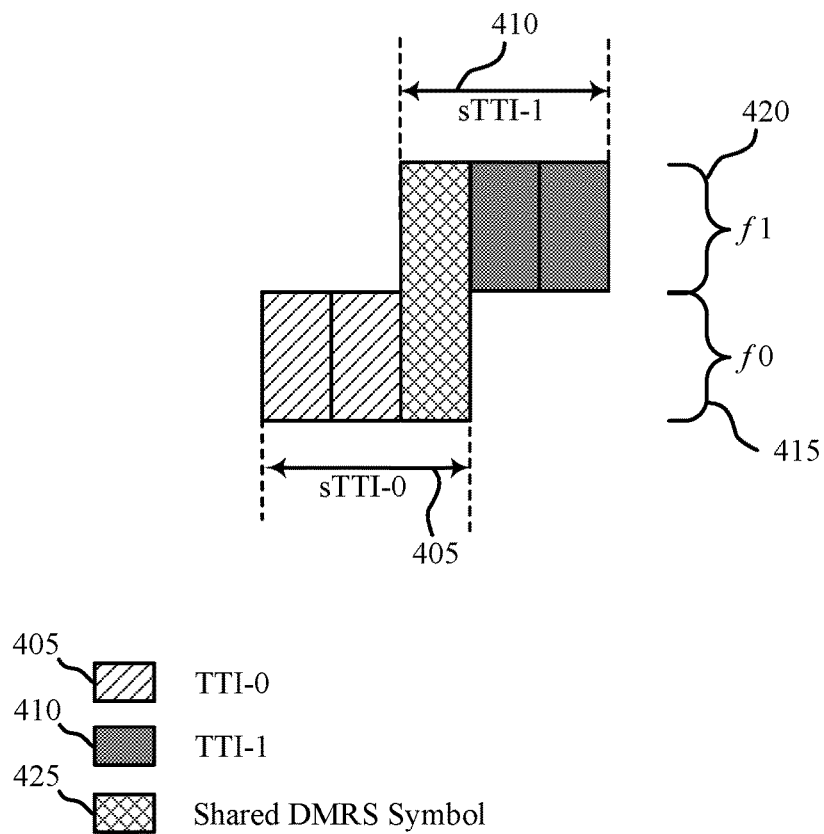
FIG. 4 illustrates another example of sTTI resources that support reference signal pattern and pilot sharing for shortened transmission time interval wireless communications in accordance with aspects of the present disclosure.

FIG. 4 illustrates an example of sTTI resources 400 for reference signal pattern and pilot sharing for shortened transmission time interval wireless communications. The sTTI resources 400 may be used, for example, in slot-aligned sTTI patterns for low latency communications between a UE and a base station such as discussed above with respect to FIGS. 1 and 2. In this example, a first sTTI (sTTI-0) 405 may be allocated first uplink frequency resources (f0) 415, and a second sTTI (sTTI-1) 410 may be allocated second uplink frequency resources (f1) 420. In this example, the first frequency resources 415 and the second frequency resources 420 occupy a set of disjoint but consecutive resources. Shared DMRS symbol 425 may span both the first frequency resources 415 and the second frequency resources 420. In such examples, two options to generate the DMRS sequence for each sTTI may include independent DMRS generation per sTTI assignment, or long DMRS sequences for each sTTI where generated DMRS sequences cover the entire allocated band to span both the first frequency resources 415 and the second frequency resources 420.

In cases where independent DMRS sequences are generated for the first sTTI 405 and the second sTTI 410, each DMRS sequence length corresponds to the allocation length for the respective first frequency resources 415 or second frequency resources 420. In cases where a long DMRS sequence is used, two long DMRS sequences that cover both the first frequency resources 415 and the second frequency resources 420 may be generated, with a different cyclic shift applied for the first sTTI 405 and the second sTTI 410. Long DMRS sequence generation may be beneficial to provide a better channel estimation quality in some cases. In other cases, such as cases where the frequency resources occupy a relatively highly frequency selective channel, it may be more difficult to keep received sequences orthogonal at the receiver, and independent DMRS generation may be beneficial. In some cases, independent or long DMRS sequence generation may be selected based, at least in part, on channel conditions and a size of the allocation. In some cases, the DMRS sequence generation for consecutive frequency resource allocations may be standardized or signaled in a grant or other control signaling from a base station.

Figure 5:
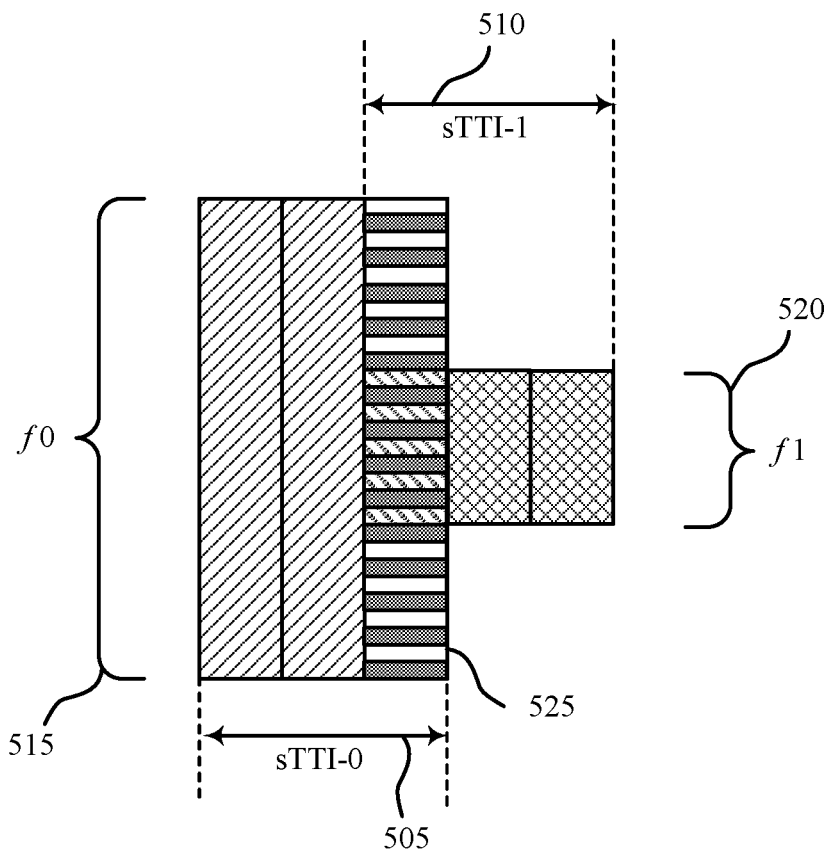
FIG. 5 illustrates an example of a sTTI resources and interlaced DMRS resources that support reference signal pattern and pilot sharing for shortened transmission time interval wireless communications in accordance with aspects of the present disclosure.
Figure 5:
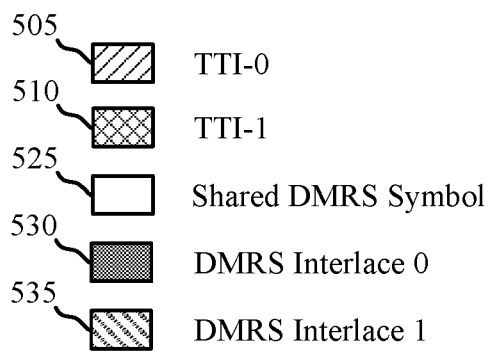

FIG. 5 illustrates an example of sTTI resources 500 and interlaced DMRS resources for reference signal pattern and pilot sharing for shortened transmission time interval wireless communications. The sTTI resources 500 may be used, for example, in slot-aligned sTTI patterns for low latency communications between a UE and a base station such as discussed above with respect to FIGS. 1 and 2. In this example, a first sTTI (sTTI-0) 505 may be allocated first uplink frequency resources (f0) 515, and a second sTTI (sTTI-1) 510 may be allocated second uplink frequency resources (f1) 520. Thus, in this example, the first frequency resources 515 are a superset of the second frequency resources 520. Shared DMRS symbol 525 may span both the first frequency resources 515 and the second frequency resources 520. In such examples, different interlaces may be provided for DMRS transmissions of each sTTI. While the example of FIG. 5 illustrates the first frequency resources 515 as a superset of the second frequency resources 520, in other examples the first frequency resources 515 and second frequency resources 520 may partially overlap, with a subset of frequency resources from each of the first frequency resources 515 and second frequency resources 520 overlapping. Different interlaces for DMRS transmissions may be used in such partially overlapping examples as well, with DMRS transmissions for each sTTI transmitted in the different interlaces.

In the example of FIG. 5, since the first sTTI 505 and the second sTTI 510 overlap in frequency, but occupy an uneven number of resources, the DMRS sequences are not orthogonal. In such cases, DMRSs can be transmitted over different interlaces, with the first sTTI 505 using a first DMRS interlace (DMRS interlace 0) 530, and the second sTTI 510 using a second DMRS interlace (DMRS interlace 1) 535. The second DMRS interlace 535 may span frequency resources of the shared DMRS symbol 525 corresponding to the second uplink frequency resources. Thus, the separate DMRS sequences transmitted in the different interlaces are orthogonal in frequency. In further examples, as discussed above, frequency resources for the sTTIs may be non-overlapping and non-adjacent, in which case the DMRS sequence for each sTTI may be generated independently, and the length of each sequence may correspond to the frequency allocation for the respective sTTI.

Figure 6:
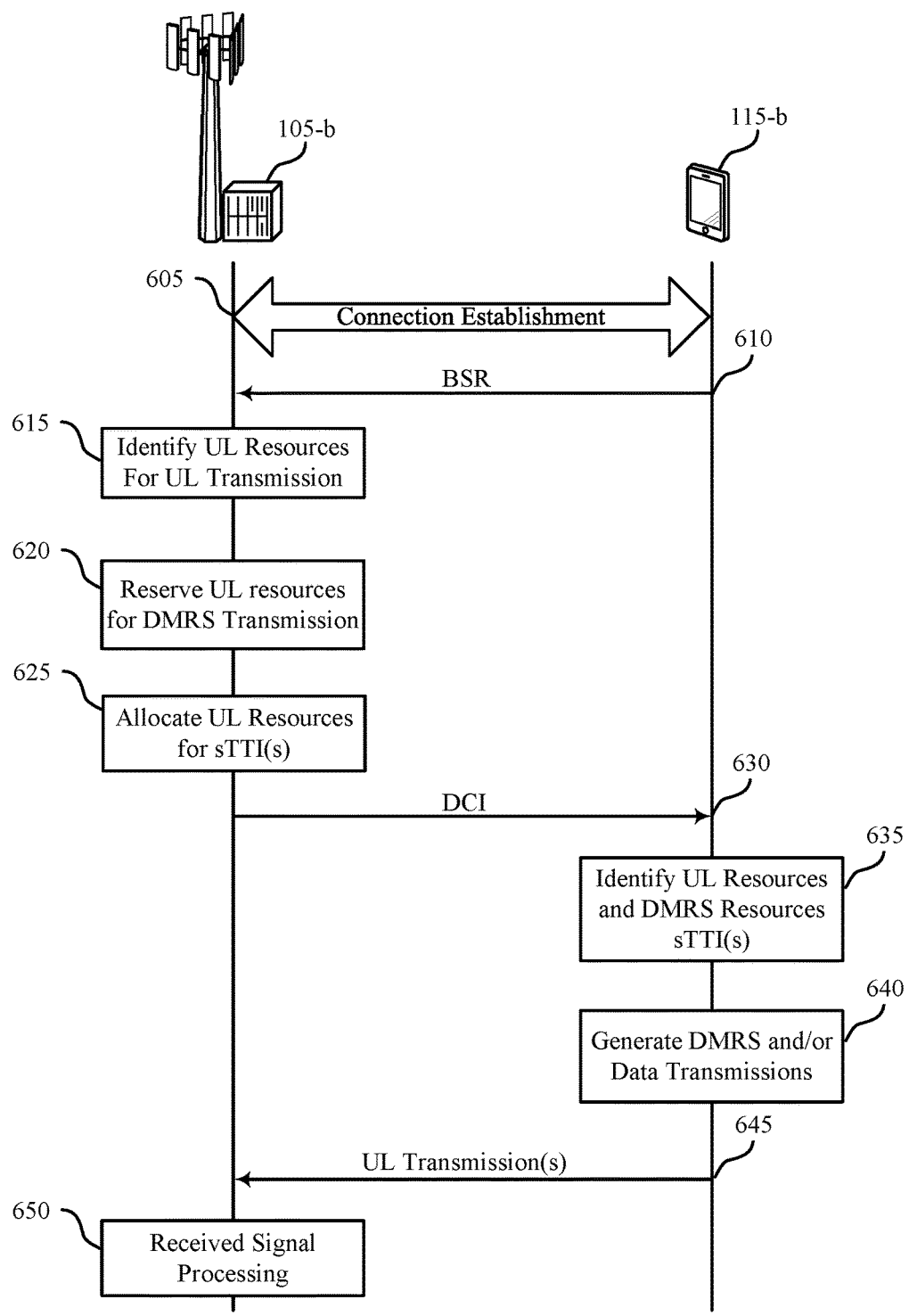
FIG. 6 illustrates an example of a process flow that supports reference signal pattern and pilot sharing for shortened transmission time interval wireless communications in accordance with aspects of the present disclosure.

FIG. 6 illustrates an example of a process flow 600 for reference signal pattern and pilot sharing for shortened transmission time interval wireless communications. Process flow 600 may include a base station 105-b, and a UE 115-b, which may be examples of the corresponding devices described with reference to FIG. 1-2. The base station 105-b and the UE 115-b may establish a connection 605 according to established connection establishment techniques for the wireless communications system. The UE 115-b may transmit, in some examples, a buffer status report (BSR) 610 that may indicate the presence of uplink data for transmission, and may also indicate that a service for the data is a low-latency service or other service that may use sTTIs.

At block 615, base station 105-b may identify uplink resources for uplink transmissions to be transmitted by the UE 115-a. For example, the base station 105-b may identify that the uplink data indicated by the UE 115-b may take a number of sTTIs to transmit, which may be determined based on various factors such as channel conditions between the base station 105-b and the UE 115-b, a modulation coding scheme (MCS) supported by the channel used for transmissions, a MIMO configuration, etc.

At block 620, the base station 105-b may reserve uplink resources for DMRS transmissions. Such a reservation of resources may include identifying a shared DMRS symbol for two sTTIs that are to be transmitted within a slot of a 1 ms subframe. In some cases, as discussed above, the shared DMRS symbol may be a third OFDM symbol (i.e., symbol 2 of FIG. 2) of a slot, and may be shared by a first sTTI and a second sTTI for transmission of a DMRS. As discussed above, in some cases the shared DMRS symbol may be located adjacent to or within the first sTTI and the second sTTI.

At block 625, the base station 105-b may allocate uplink resources for the identified sTTIs, which may include an allocation for at least a first sTTI and a second sTTI in some examples. The allocation of resources may be determined based on a number of data symbols needed to service the UE 115-b uplink data, and may include an allocation of resources for DMRS transmissions. In cases where the first sTTI and the second sTTI include or are adjacent to the reserved DMRS resources, a separate indication of DMRS resources may not be needed because the UE 115-b may recognize that the allocated sTTIs have associated shared DMRS resources.

The base station 105-b may transmit downlink control information (DCI) 630 to the UE 115-b. The DCI 630 may include, for example, a sPDCCH uplink grant that indicates allocated uplink resources for two or more sTTIs. In some cases, the reserved DMRS resources may be used for DMRS transmissions of the two or more sTTIs. In some cases, where UE 115-b may be scheduled for one or more sTTIs that do not contain or are not adjacent to the reserved DMRS resources, and the DCI 630 may include an indication of DMRS resources for such sTTIs, which may include resources of the reserved DMRS resources or may include other uplink resources.

At block 635, the UE 115-a may identify the uplink resources and DMRS resources for the sTTI(s). In cases, where the uplink resources include one or more sTTIs that contain or are adjacent to known shared DMRS resources, the UE may identify the DMRS resources for such sTTIs as being the reserved DMRS resources. In some cases, the reserved DMRS resources may be signaled to the UE in the DCI, or in other control signaling, or in radio resource control (RRC) signaling, for example. In cases where the DMRS resources for a sTTI may not be located in the reserved DMRS resources, the UE 115-b may determine a symbol for DMRS transmission based on a symbol in which the DCI 630 is received plus an offset (e.g., two or four symbols) following the DCI 630.

At block 640, the UE 115-b may generate the DMRS and/or data transmissions for the sTTI(s). The data transmissions and/or DMRS may be generated based on the allocated resources from an uplink grant provided in the DCI 630, for example. In some cases, the UE 115-a may apply a cyclic shift to the DMRS transmissions in order to multiplex the DMRS transmission with a second DMRS transmission of a second sTTI from the UE 115-b or another UE.

UE 115-b may then transmit uplink transmission(s) 645 to the base station 105-b, which may perform received signal processing at block 650. Such processing may include demodulating the uplink transmissions 645 using a transmitted DMRS from a sTTI or from one or more previously received sTTIs. In some case, such processing may include acknowledgment feedback processing (e.g., HARQ feedback). In some examples, the DMRS sequence of the uplink transmission(s) 645 may be determined based on the sTTI and the frequency resources used for different sTTIs that share the reserved DMRS resources.

Figure 7:
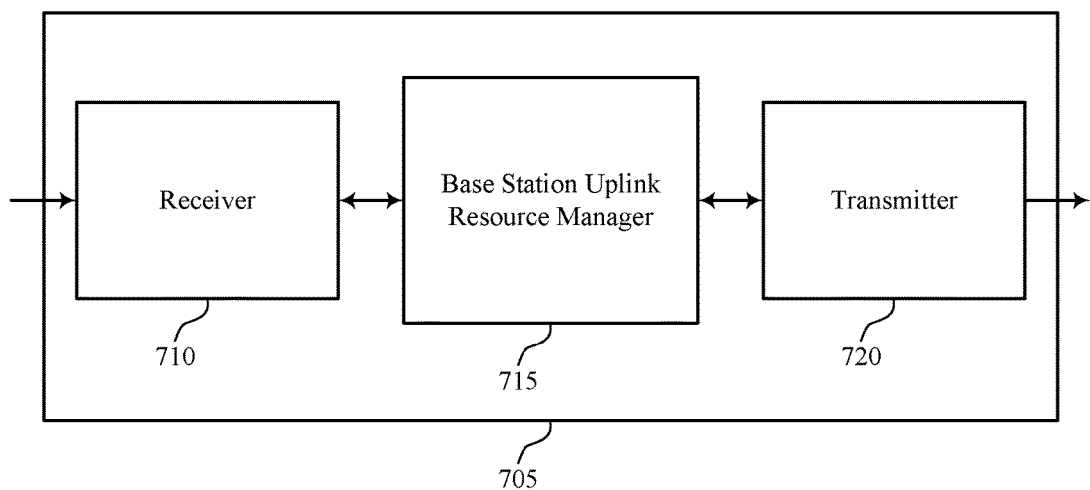
FIGS. 7 through 9 show block diagrams of a device that supports reference signal pattern and pilot sharing for shortened transmission time interval wireless communications in accordance with aspects of the present disclosure.

FIG. 7 shows a block diagram 700 of a wireless device 705 that supports reference signal pattern and pilot sharing for shortened transmission time interval wireless communications in accordance with various aspects of the present disclosure. Wireless device 705 may be an example of aspects of a base station 105 as described with reference to FIG. 1. Wireless device 705 may include receiver 710, base station uplink resource manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to reference signal pattern and pilot sharing for shortened transmission time interval wireless communications, etc.). Information may be passed on to other components of the device. The receiver 710 may be an example of aspects of the transceiver 1035 described with reference to FIG. 10.

Base station uplink resource manager 715 may be an example of aspects of the base station uplink resource manager 1015 described with reference to FIG. 10. Base station uplink resource manager 715 may allocate uplink resources for at least a first TTI and a second TTI within a slot that includes a set of OFDM symbols, reserve a subset of reserved uplink resources of a first OFDM symbol within the slot to be shared by the first TTI and the second TTI for transmission of a DMRS, the first OFDM symbol located adjacent to or within the first TTI and the second TTI, and transmit an uplink grant for an uplink transmission to a UE, the uplink grant including an indication of the allocated uplink resources.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
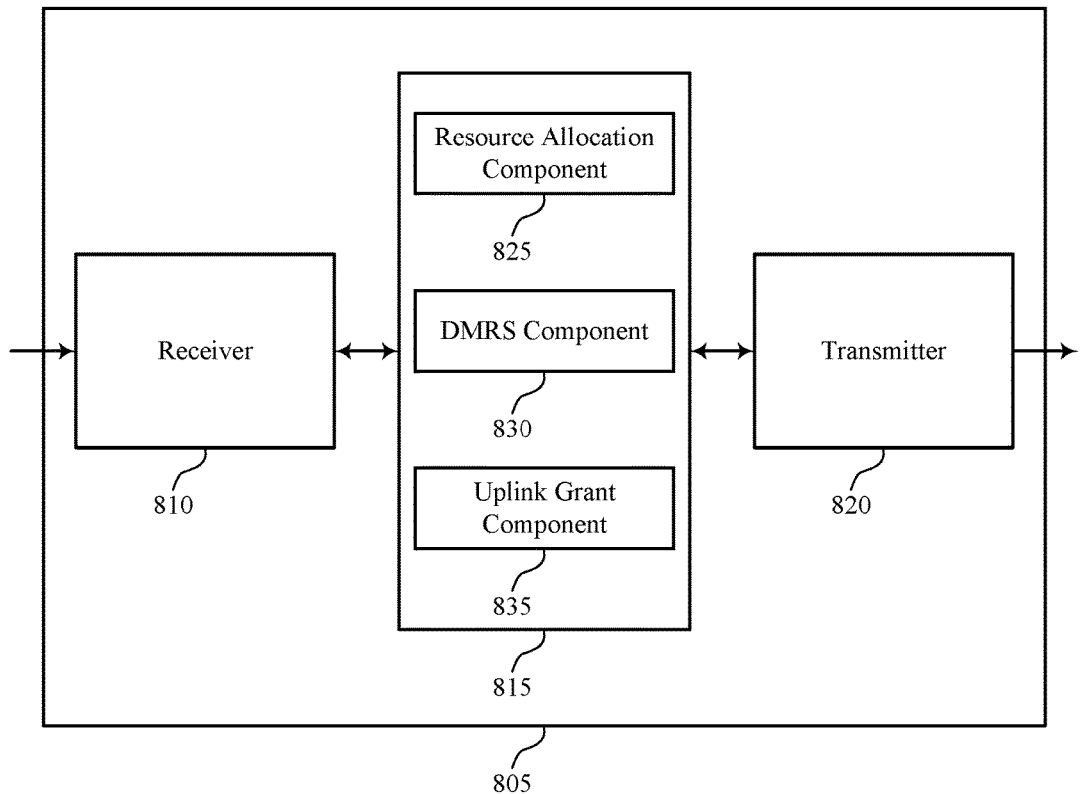

FIG. 8 shows a block diagram 800 of a wireless device 805 that supports reference signal pattern and pilot sharing for shortened transmission time interval wireless communications in accordance with various aspects of the present disclosure. Wireless device 805 may be an example of aspects of a wireless device 705 or a base station 105 as described with reference to FIGS. 1 and 7. Wireless device 805 may include receiver 810, base station uplink resource manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to reference signal pattern and pilot sharing for shortened transmission time interval wireless communications, etc.). Information may be passed on to other components of the device. The receiver 810 may be an example of aspects of the transceiver 1035 described with reference to FIG. 10.

Base station uplink resource manager 815 may be an example of aspects of the base station uplink resource manager 1015 described with reference to FIG. 10. Base station uplink resource manager 815 may also include resource allocation component 825, DMRS component 830, and uplink grant component 835.

Resource allocation component 825 may allocate uplink resources for at least a first TTI and a second TTI within a slot that includes a set of OFDM symbols. In some cases, the resource allocation component 825 may identify that the first TTI and the second TTI include a same set of frequency resources, identify that the first TTI includes a first set of frequency resources and that the second TTI includes second set of frequency resources that is adjacent to the first set of frequency resources, identify that the first TTI includes a first set of frequency resources and that the second TTI includes second set of frequency resources that is a subset of the first set of frequency resources, or identify that the first TTI includes a first set of frequency resources and that the second TTI includes second set of frequency resources that is non-adjacent to and non-overlapping with the first set of frequency resources. The resource allocation component 825 may reserve DMRS resources based at least in part on the frequency resources for the first TTI and the second TTI. In some cases, the resource allocation component 825 may identify that the first TTI has three OFDM symbols and the second TTI has three OFDM symbols, and where a first OFDM symbol that includes shared DMRS resources may be a common symbol between the first TTI and the second TTI. The resource allocation component 825 may, in some examples, configure one or more of the first TTI or the second TTI to have, in addition to the first OFDM symbol with the shared DMRS resources, two data OFDM symbols or one data OFDM symbol and one pilot OFDM symbol. In some cases, the allocated uplink resources include resources for a third TTI that includes two OFDM symbols that are non-adjacent to the first OFDM symbol, and the resource allocation component 825 may identify a DMRS resource for the third TTI.

DMRS component 830 may reserve a subset of reserved uplink resources of a first OFDM symbol within the slot to be shared by the first TTI and the second TTI for transmission of a DMRS, the first OFDM symbol located adjacent to or within the first TTI and the second TTI. In cases where a third TTI includes resources that are non-adjacent to the first OFDM symbol, the DMRS component 830 may transmit signaling indicating the DMRS resource for the third TTI. In some cases, each of the two OFDM symbols of the third TTI are data OFDM symbols, and where the DMRS resource for the third TTI includes a resource located within the first OFDM symbol. In some cases, the DMRS resource for the third TTI is located two or more OFDM symbols after the signaling indicating the DMRS resource for the third TTI. In some cases, the DMRS resource is included in pilot signal resources within one of the two OFDM symbols of the third TTI.

Uplink grant component 835 may transmit an uplink grant for an uplink transmission to a UE, the uplink grant including an indication of the allocated uplink resources.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
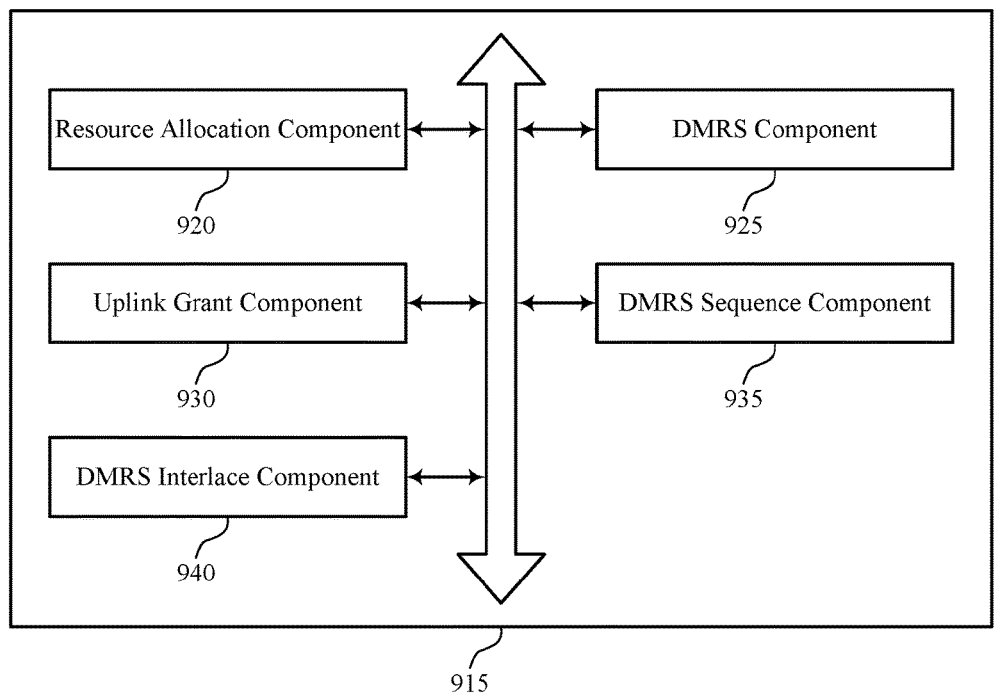

FIG. 9 shows a block diagram 900 of a base station uplink resource manager 915 that supports reference signal pattern and pilot sharing for shortened transmission time interval wireless communications in accordance with various aspects of the present disclosure. The base station uplink resource manager 915 may be an example of aspects of a base station uplink resource manager 715, a base station uplink resource manager 815, or a base station uplink resource manager 1015 described with reference to FIGS. 7, 8, and 10. The base station uplink resource manager 915 may include resource allocation component 920, DMRS component 925, uplink grant component 930, DMRS sequence component 935, and DMRS interlace component 940. Each of these modules may communicate, directly or indirectly, with one another (e.g., via one or more buses).

Resource allocation component 920 may allocate uplink resources for at least a first TTI and a second TTI within a slot that includes a set of OFDM symbols. In some cases, the resource allocation component 920 may identify that the first TTI and the second TTI include a same set of frequency resources, identify that the first TTI includes a first set of frequency resources and that the second TTI includes second set of frequency resources that is adjacent to the first set of frequency resources, identify that the first TTI includes a first set of frequency resources and that the second TTI includes second set of frequency resources that is a subset of the first set of frequency resources, or identify that the first TTI includes a first set of frequency resources and that the second TTI includes second set of frequency resources that is non-adjacent to and non-overlapping with the first set of frequency resources. The resource allocation component 920 may reserve DMRS resources based at least in part on the frequency resources for the first TTI and the second TTI. In some cases, the resource allocation component 920 may identify that the first TTI has three OFDM symbols and the second TTI has three OFDM symbols, and where a first OFDM symbol that includes shared DMRS resources may be a common symbol between the first TTI and the second TTI. The resource allocation component 920 may, in some examples, configure one or more of the first TTI or the second TTI to have, in addition to the first OFDM symbol with the shared DMRS resources, two data OFDM symbols or one data OFDM symbol and one pilot OFDM symbol. In some cases, the allocated uplink resources include resources for a third TTI that includes two OFDM symbols that are non-adjacent to the first OFDM symbol, and the resource allocation component 920 may identify a DMRS resource for the third TTI.

DMRS component 925 may reserve a subset of reserved uplink resources of a first OFDM symbol within the slot to be shared by the first TTI and the second TTI for transmission of a DMRS, the first OFDM symbol located adjacent to or within the first TTI and the second TTI. In cases where a third TTI includes resources that are non-adjacent to the first OFDM symbol, the DMRS component 925 may transmit signaling indicating the DMRS resource for the third TTI. In some cases, each of the two OFDM symbols of the third TTI are data OFDM symbols, and where the DMRS resource for the third TTI includes a resource located within the first OFDM symbol. In some cases, the DMRS resource for the third TTI is located two or more OFDM symbols after the signaling indicating the DMRS resource for the third TTI. In some cases, the DMRS resource is included in pilot signal resources within one of the two OFDM symbols of the third TTI.

Uplink grant component 930 may transmit an uplink grant for an uplink transmission to a UE, the uplink grant including an indication of the allocated uplink resources.

DMRS sequence component 935 may configure a DMRS sequence for the first TTI or the second TTI. In some cases, the DMRS sequence may be based on a first cyclic shift (CS) of a base DMRS sequence. In some examples, DMRS sequence component 935 may configure a second DMRS sequence for the second TTI based on a second CS of the base DMRS sequence, the first DMRS sequence and the second DMRS sequence having a same length. In some cases, DMRS sequence component 935 may configure a first DMRS sequence for the first TTI having a first sequence length that corresponds to the first set of frequency resources, and configure, independently of the first DMRS sequence, a second DMRS sequence for the second TTI having a second sequence length that corresponds to the second set of frequency resources. In some cases, DMRS sequence component 935 may configure a first DMRS sequence for the first TTI having a first sequence length that spans both the first set of frequency resources and the second set of frequency resources, and configure a second DMRS sequence for the second TTI having a second sequence length that spans both the first set of frequency resources and the second set of frequency resources. In further cases, DMRS sequence component 935 may configure, independently of the first DMRS sequence, a second DMRS sequence for the second TTI having a second sequence length that corresponds to the second set of frequency resources that is non-adjacent to and non-overlapping with the first set of frequency resources.

DMRS interlace component 940 may configure a first interlace within the first set of frequency resources for transmission of a first DMRS sequence for the first TTI, the first DMRS sequence having a first sequence length that corresponds to the first set of frequency resources and configure a second interlace within the subset of the first set of frequency resources for transmission of a second DMRS sequence for the second TTI, the second DMRS sequence having a second sequence length that corresponds to the second set of frequency resources.

Figure 10:
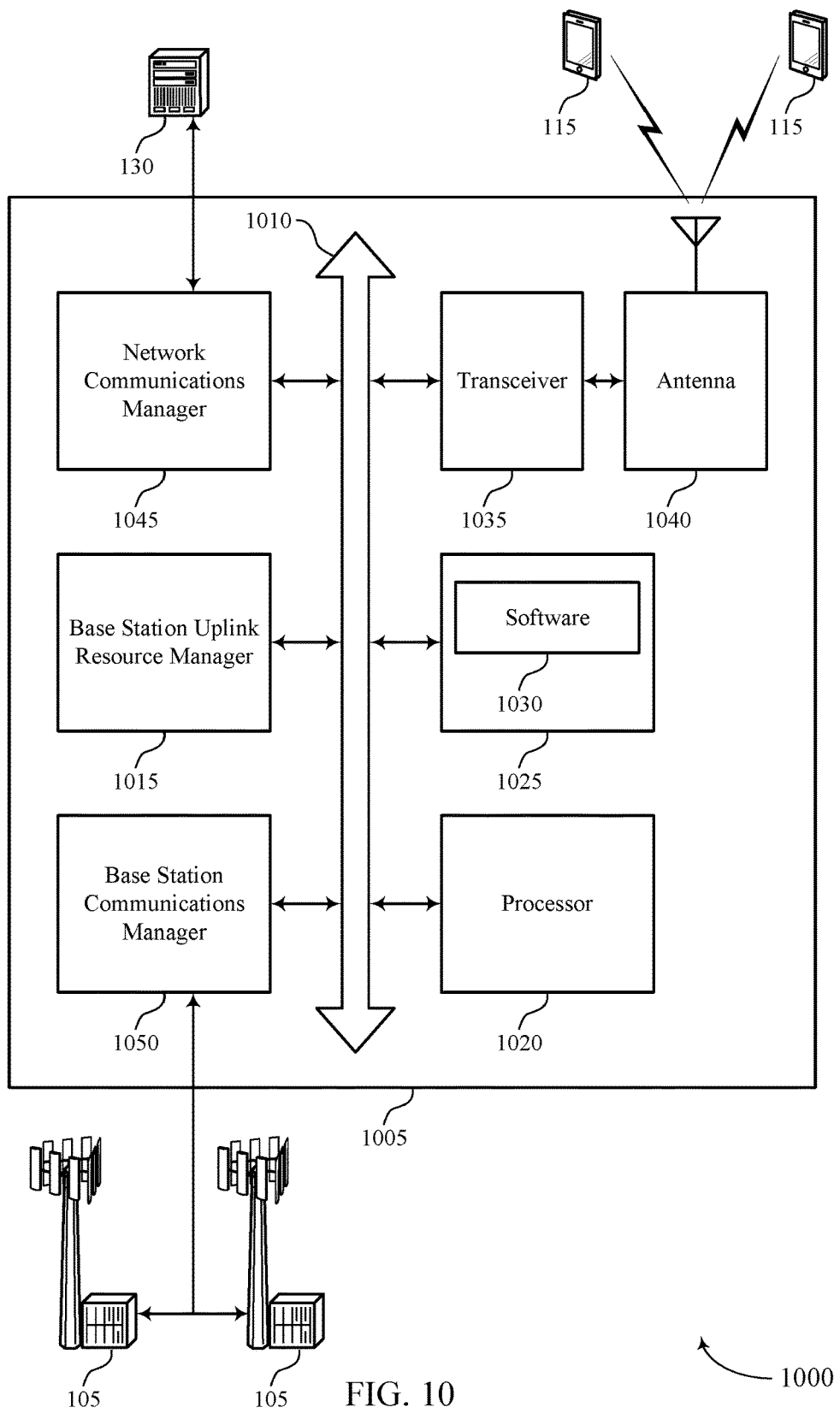
FIG. 10 illustrates a block diagram of a system including a base station that supports reference signal pattern and pilot sharing for shortened transmission time interval wireless communications in accordance with aspects of the present disclosure.

FIG. 10 shows a diagram of a system 1000 including a device 1005 that supports reference signal pattern and pilot sharing for shortened transmission time interval wireless communications in accordance with various aspects of the present disclosure. Device 1005 may be an example of or include the components of wireless device 705, wireless device 805, or a base station 105 as described above, e.g., with reference to FIGS. 1, 7 and 8. Device 1005 may include components for bi-directional voice and data communications including components for transmitting and receiving communications, including base station uplink resource manager 1015, processor 1020, memory 1025, software 1030, transceiver 1035, antenna 1040, network communications manager 1045, and base station communications manager 1050. These components may be in electronic communication via one or more busses (e.g., bus 1010). Device 1005 may communicate wirelessly with one or more UEs 115.

Base station uplink resource manager 1015 may be an example of base station uplink resource manager 715 of FIG. 7, base station uplink resource manager 815 of FIG. 8, or base station uplink resource manager 915 of FIG. 9.

Processor 1020 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting reference signal pattern and pilot sharing for shortened transmission time interval wireless communications).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support reference signal pattern and pilot sharing for shortened transmission time interval wireless communications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Base station communications manager 1050 may manage communications with other base station 105, and may include a controller or scheduler for controlling communications with UEs 115 in cooperation with other base stations 105. For example, the base station communications manager 1050 may coordinate scheduling for transmissions to UEs 115 for various interference mitigation techniques such as beamforming or joint transmission. In some examples, base station communications manager 1050 may provide an X2 interface within a Long Term Evolution (LTE)/LTE-A or NR wireless communication network technology to provide communication between base stations 105.

Figure 11:
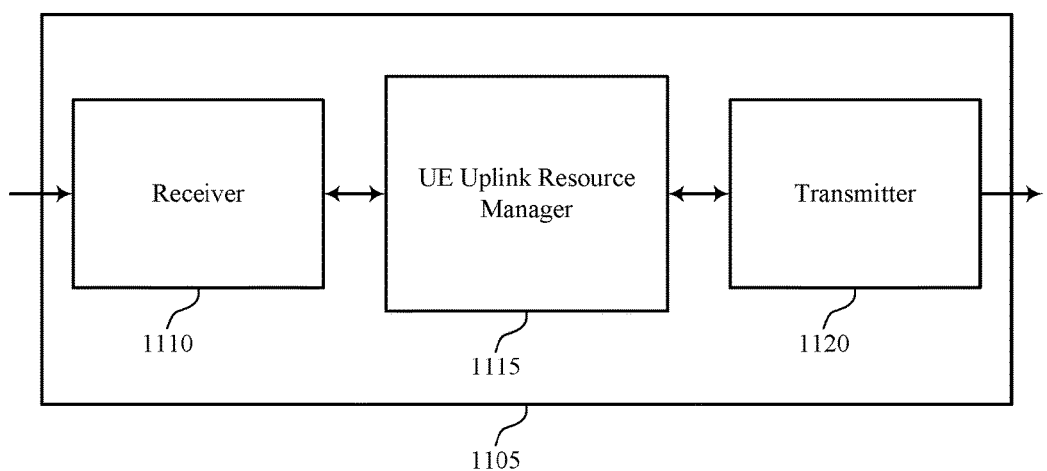
FIGS. 11 through 13 show block diagrams of a device that supports reference signal pattern and pilot sharing for shortened transmission time interval wireless communications in accordance with aspects of the present disclosure.

FIG. 11 shows a block diagram 1100 of a wireless device 1105 that supports reference signal pattern and pilot sharing for shortened transmission time interval wireless communications in accordance with various aspects of the present disclosure. Wireless device 1105 may be an example of aspects of a UE 115 as described with reference to FIG. 1. Wireless device 1105 may include receiver 1110, UE uplink resource manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to reference signal pattern and pilot sharing for shortened transmission time interval wireless communications, etc.). Information may be passed on to other components of the device. The receiver 1110 may be an example of aspects of the transceiver 1435 described with reference to FIG. 14. Receiver 1110 may, in some examples, receive signaling indicating a DMRS resource for the one or more TTIs.

UE uplink resource manager 1115 may be an example of aspects of the UE uplink resource manager 1415 described with reference to FIG. 14. UE uplink resource manager 1115 may receive an allocation of uplink resources from a base station for at least a first TTI and a second TTI within a slot that includes a set of OFDM symbols and identify reserved uplink resources of a first OFDM symbol within the slot to be shared by the first TTI and the second TTI for transmission of a DMRS, the first OFDM symbol located adjacent to or within the first TTI and the second TTI.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Transmitter 1120 may, in some example, in conjunction with UE uplink resource manager 1115, transmit one or more DMRS sequences in the first OFDM symbol, transmit a DMRS sequences in a different interlaces in the first OFDM symbol, and transmit one or more uplink transmission to the base station using the allocated uplink resources and the reserved uplink resources.

Figure 12:
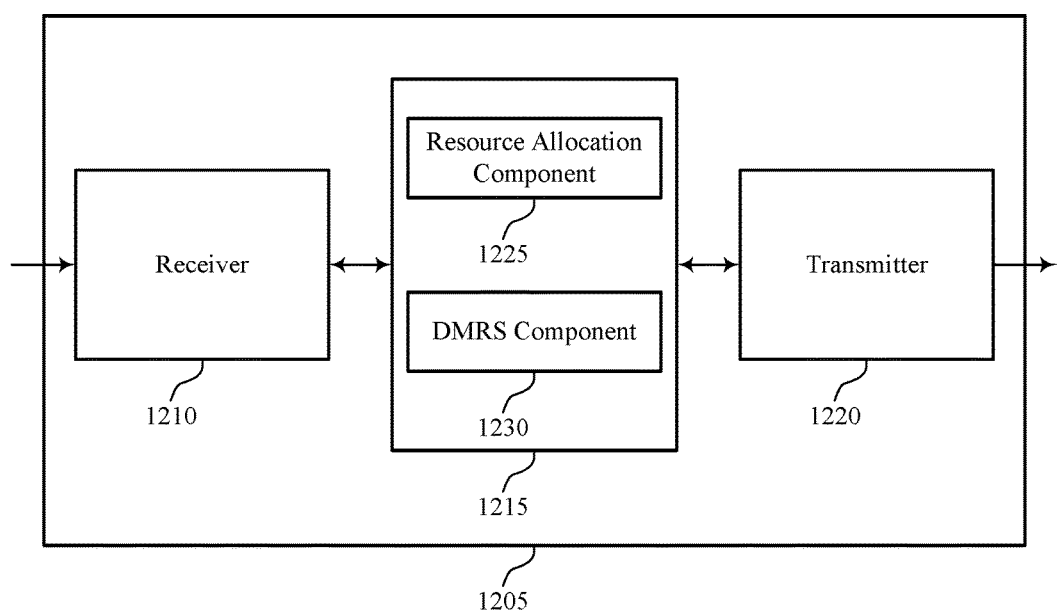

FIG. 12 shows a block diagram 1200 of a wireless device 1205 that supports reference signal pattern and pilot sharing for shortened transmission time interval wireless communications in accordance with various aspects of the present disclosure. Wireless device 1205 may be an example of aspects of a wireless device 1105 or a UE 115 as described with reference to FIGS. 1 and 11. Wireless device 1205 may include receiver 1210, UE uplink resource manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to reference signal pattern and pilot sharing for shortened transmission time interval wireless communications, etc.). Information may be passed on to other components of the device. The receiver 1210 may be an example of aspects of the transceiver 1435 described with reference to FIG. 14.

UE uplink resource manager 1215 may be an example of aspects of the UE uplink resource manager 1415 described with reference to FIG. 14. UE uplink resource manager 1215 may also include resource allocation component 1225 and DMRS component 1230.

Resource allocation component 1225 may receive an allocation of uplink resources from a base station for at least a first TTI and a second TTI within a slot that includes a set of OFDM symbols. In some cases, resource allocation component 1225 may identify that the first TTI and the second TTI include a same set of frequency resources, identify that the first TTI includes a first set of frequency resources and that the second TTI includes second set of frequency resources that is adjacent to the first set of frequency resources, identify that the first TTI includes a first set of frequency resources and that the second TTI includes second set of frequency resources that is a subset of the first set of frequency resources, or identify that the first TTI includes a first set of frequency resources and that the second TTI included second set of frequency resources that is non-adjacent to and non-overlapping with the first set of frequency resources. In some cases, resource allocation component 1225 may identify that the first TTI that has three OFDM symbols and the second TTI that has three OFDM symbols, and where the first OFDM symbol is shared between the first TTI and the second TTI. In some cases, one or more of the first TTI or the second TTI includes, in addition to the first OFDM symbol, two data OFDM symbols or one data OFDM symbol and one pilot OFDM symbol. In some cases, the allocation of uplink resources further includes uplink resources for a third TTI that includes two OFDM symbols that are non-adjacent to the first OFDM symbol.

DMRS component 1230 may identify reserved uplink resources of a first OFDM symbol within the slot to be shared by the first TTI and the second TTI for transmission of a demodulation reference signal (DMRS), the first OFDM symbol located adjacent to or within the first TTI and the second TTI.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
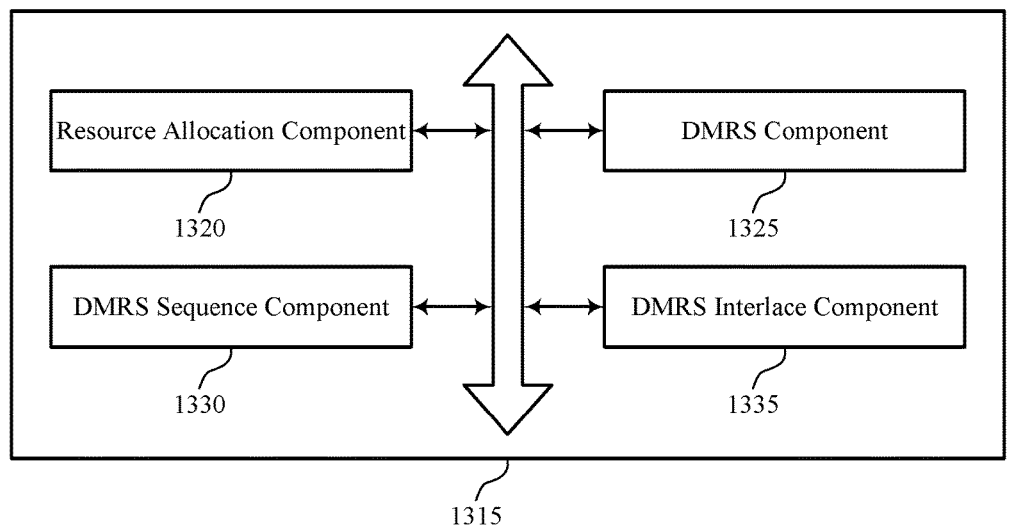

FIG. 13 shows a block diagram 1300 of a UE uplink resource manager 1315 that supports reference signal pattern and pilot sharing for shortened transmission time interval wireless communications in accordance with various aspects of the present disclosure. The UE uplink resource manager 1315 may be an example of aspects of a UE uplink resource manager 1415 described with reference to FIGS. 11, 12, and 14. The UE uplink resource manager 1315 may include resource allocation component 1320, DMRS component 1325, DMRS sequence component 1330, and DMRS interlace component 1335. Each of these modules may communicate, directly or indirectly, with one another (e.g., via one or more buses).

Resource allocation component 1320 may receive an allocation of uplink resources from a base station for at least a first TTI and a second TTI within a slot that includes a set of OFDM symbols. In some cases, resource allocation component 1320 may identify that the first TTI and the second TTI include a same set of frequency resources, identify that the first TTI includes a first set of frequency resources and that the second TTI includes second set of frequency resources that is adjacent to the first set of frequency resources, identify that the first TTI includes a first set of frequency resources and that the second TTI includes second set of frequency resources that is a subset of the first set of frequency resources, or identify that the first TTI includes a first set of frequency resources and that the second TTI included second set of frequency resources that is non-adjacent to and non-overlapping with the first set of frequency resources. In some cases, resource allocation component 1320 may identify that the first TTI that has three OFDM symbols and the second TTI that has three OFDM symbols, and where the first OFDM symbol is shared between the first TTI and the second TTI. In some cases, one or more of the first TTI or the second TTI includes, in addition to the first OFDM symbol, two data OFDM symbols or one data OFDM symbol and one pilot OFDM symbol. In some cases, the allocation of uplink resources further includes uplink resources for a third TTI that includes two OFDM symbols that are non-adjacent to the first OFDM symbol.

DMRS component 1325 may identify reserved uplink resources of a first OFDM symbol within the slot to be shared by the first TTI and the second TTI for transmission of a demodulation reference signal (DMRS), the first OFDM symbol located adjacent to or within the first TTI and the second TTI.

DMRS sequence component 1330 may generate a first DMRS sequence for the first TTI based on a first cyclic shift (CS) of a base DMRS sequence, and generate a second DMRS sequence for the second TTI based on a second CS of the base DMRS sequence, the first DMRS sequence and the second DMRS sequence having a same length. In some cases, DMRS sequence component 1330 may generate a first DMRS sequence for the first TTI having a first sequence length that corresponds to the first set of frequency resources, and generate, independently of the first DMRS sequence, a second DMRS sequence for the second TTI having a second sequence length that corresponds to the second set of frequency resources. In some cases, DMRS sequence component 1330 may transmit the first DMRS sequence and the second DMRS sequence in the first OFDM symbol. In some cases, DMRS sequence component 1330 may generate a first DMRS sequence for the first TTI having a first sequence length that spans both the first set of frequency resources and the second set of frequency resources, and generate a second DMRS sequence for the second TTI having a second sequence length that spans both the first set of frequency resources and the second set of frequency resources. In some cases, DMRS sequence component 1330 may generate, independently of the first DMRS sequence, a second DMRS sequence for the second TTI having a second sequence length that corresponds to the second set of frequency resources that is non-adjacent to and non-overlapping with the first set of frequency resources.

DMRS interlace component 1335 may configure a first interlace within the first set of frequency resources for transmission of a first DMRS sequence for the first TTI and configure a second interlace within the subset of the first set of frequency resources for transmission of a second DMRS sequence for the second TTI.

Figure 14:
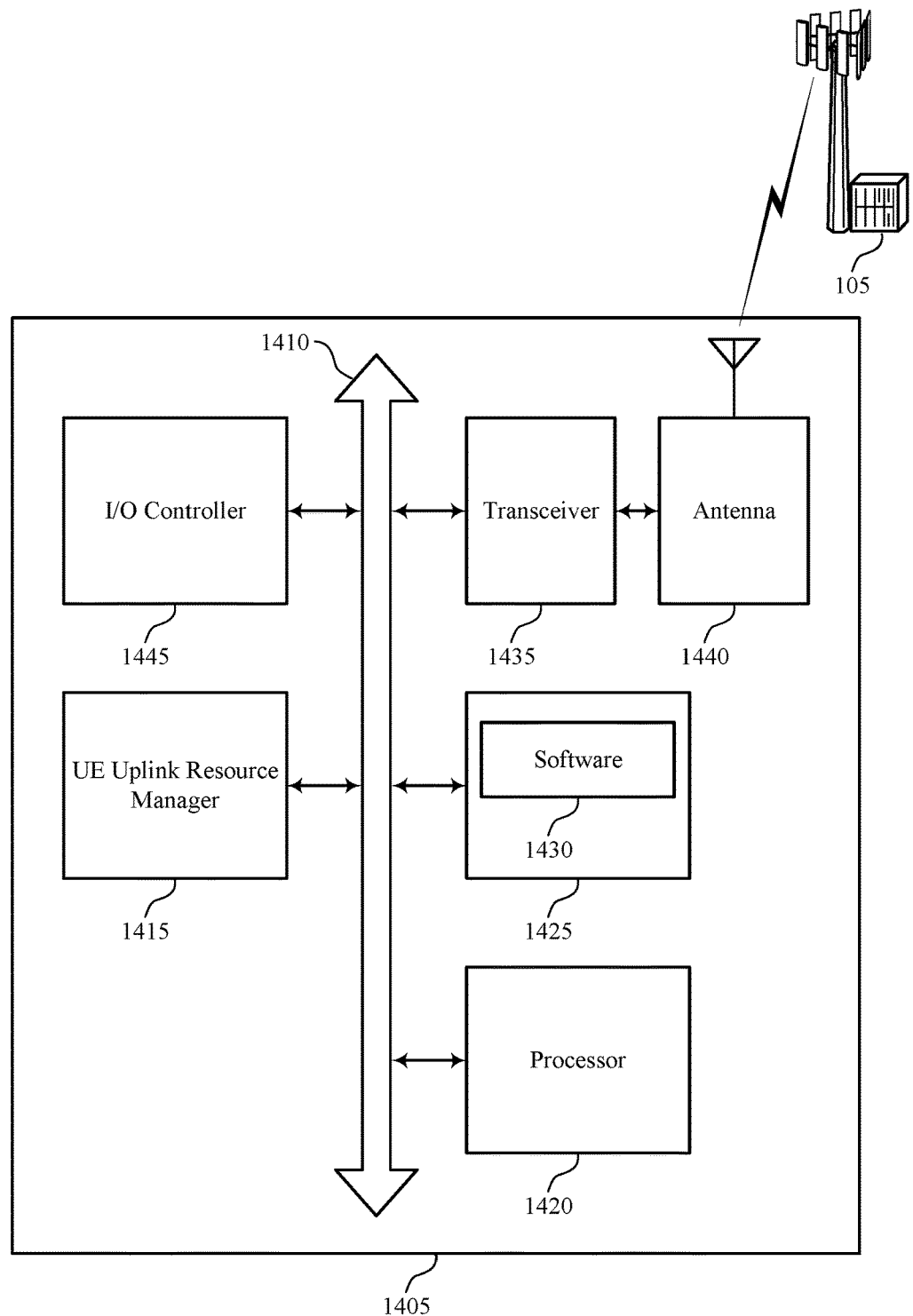
FIG. 14 illustrates a block diagram of a system including a UE that supports reference signal pattern and pilot sharing for shortened transmission time interval wireless communications in accordance with aspects of the present disclosure.

FIG. 14 shows a diagram of a system 1400 including a device 1405 that supports reference signal pattern and pilot sharing for shortened transmission time interval wireless communications in accordance with various aspects of the present disclosure. Device 1405 may be an example of or include the components of UE 115 as described above, e.g., with reference to FIG. 1. Device 1405 may include components for bi-directional voice and data communications including components for transmitting and receiving communications, including UE uplink resource manager 1415, processor 1420, memory 1425, software 1430, transceiver 1435, antenna 1440, and I/O controller 1445. These components may be in electronic communication via one or more busses (e.g., bus 1410). Device 1405 may communicate wirelessly with one or more base stations 105.

UE uplink resource manager 1415 may be an example of UE uplink resource manager 1115 of FIG. 11, UE uplink resource manager 1215 of FIG. 12, or UE uplink resource manager 1315 of FIG. 13.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting reference signal pattern and pilot sharing for shortened transmission time interval wireless communications).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS that may control basic hardware and/or software operation such as the interaction with peripheral components or devices.

Software 1430 may include code to implement aspects of the present disclosure, including code to support reference signal pattern and pilot sharing for shortened transmission time interval wireless communications. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system.

Figure 15:
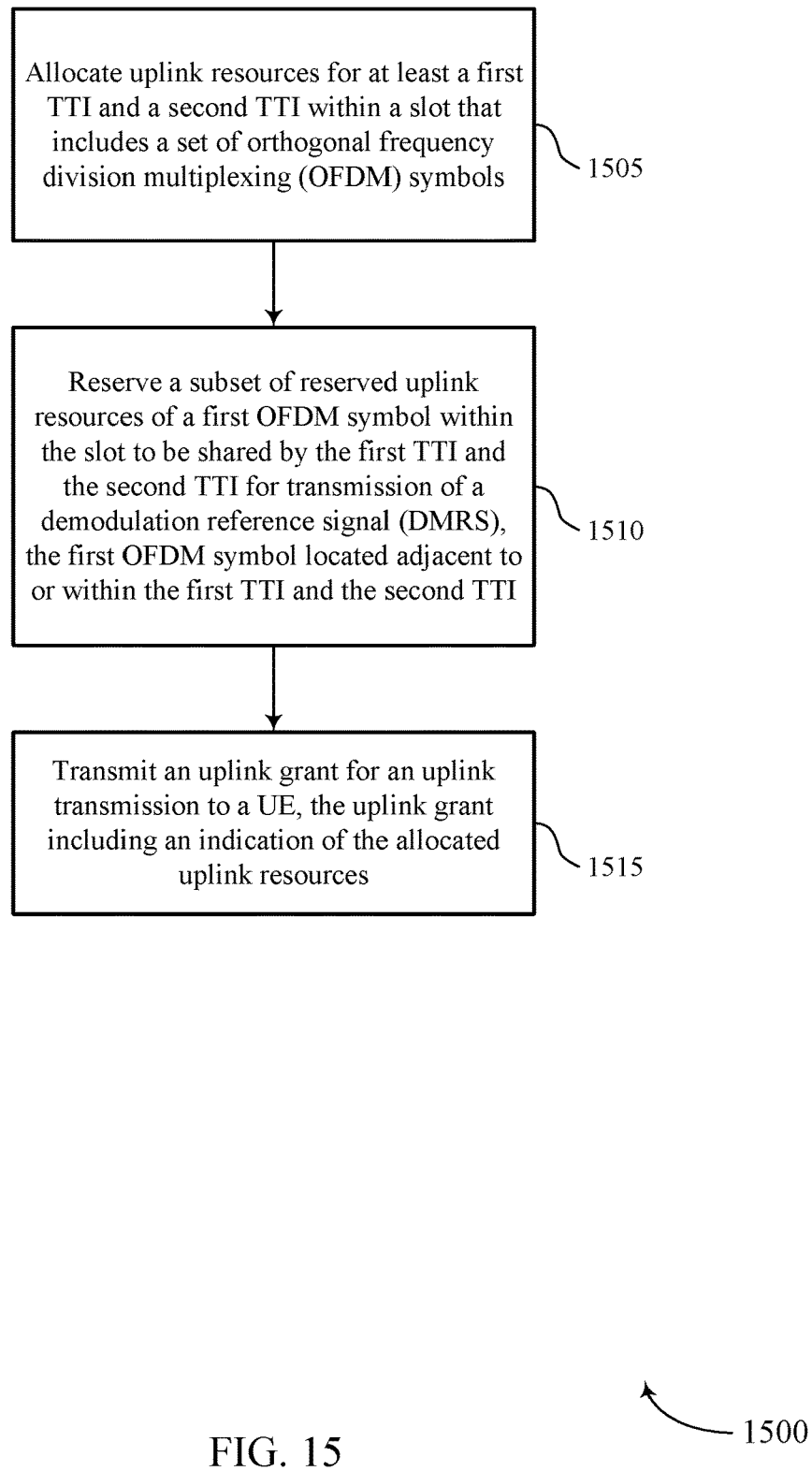
FIGS. 15 through 24 illustrate methods for reference signal pattern and pilot sharing for shortened transmission time interval wireless communications in accordance with aspects of the present disclosure.

FIG. 15 shows a flowchart illustrating a method 1500 for reference signal pattern and pilot sharing for shortened transmission time interval wireless communications in accordance with various aspects of the present disclosure. The operations of method 1500 may be implemented by a base station 105 or its components as described herein. For example, the operations of method 1500 may be performed by a base station uplink resource manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1505 the base station 105 may allocate uplink resources for at least a first TTI and a second TTI within a slot that comprises a plurality of OFDM symbols. The operations of block 1505 may be performed according to the methods described with reference to FIGS. 1 through 6. In certain examples, aspects of the operations of block 1505 may be performed by a resource allocation component as described with reference to FIGS. 7 through 10.

At block 1510 the base station 105 may reserve a subset of reserved uplink resources of a first OFDM symbol within the slot to be shared by the first TTI and the second TTI for transmission of a DMRS, the first OFDM symbol located adjacent to or within the first TTI and the second TTI. The operations of block 1510 may be performed according to the methods described with reference to FIGS. 1 through 6. In certain examples, aspects of the operations of block 1510 may be performed by a DMRS component as described with reference to FIGS. 7 through 10.

At block 1515 the base station 105 may transmit an uplink grant for an uplink transmission to a UE, the uplink grant including an indication of the allocated uplink resources. The operations of block 1515 may be performed according to the methods described with reference to FIGS. 1 through 6. In certain examples, aspects of the operations of block 1515 may be performed by a uplink grant component as described with reference to FIGS. 7 through 10, which may operate in cooperation with a transmitter 720 or 820 as described with FIG. 7 or 8, or antenna(s) 1040 and transceiver(s) 1035 as described with reference to FIG. 10.

Figure 16:
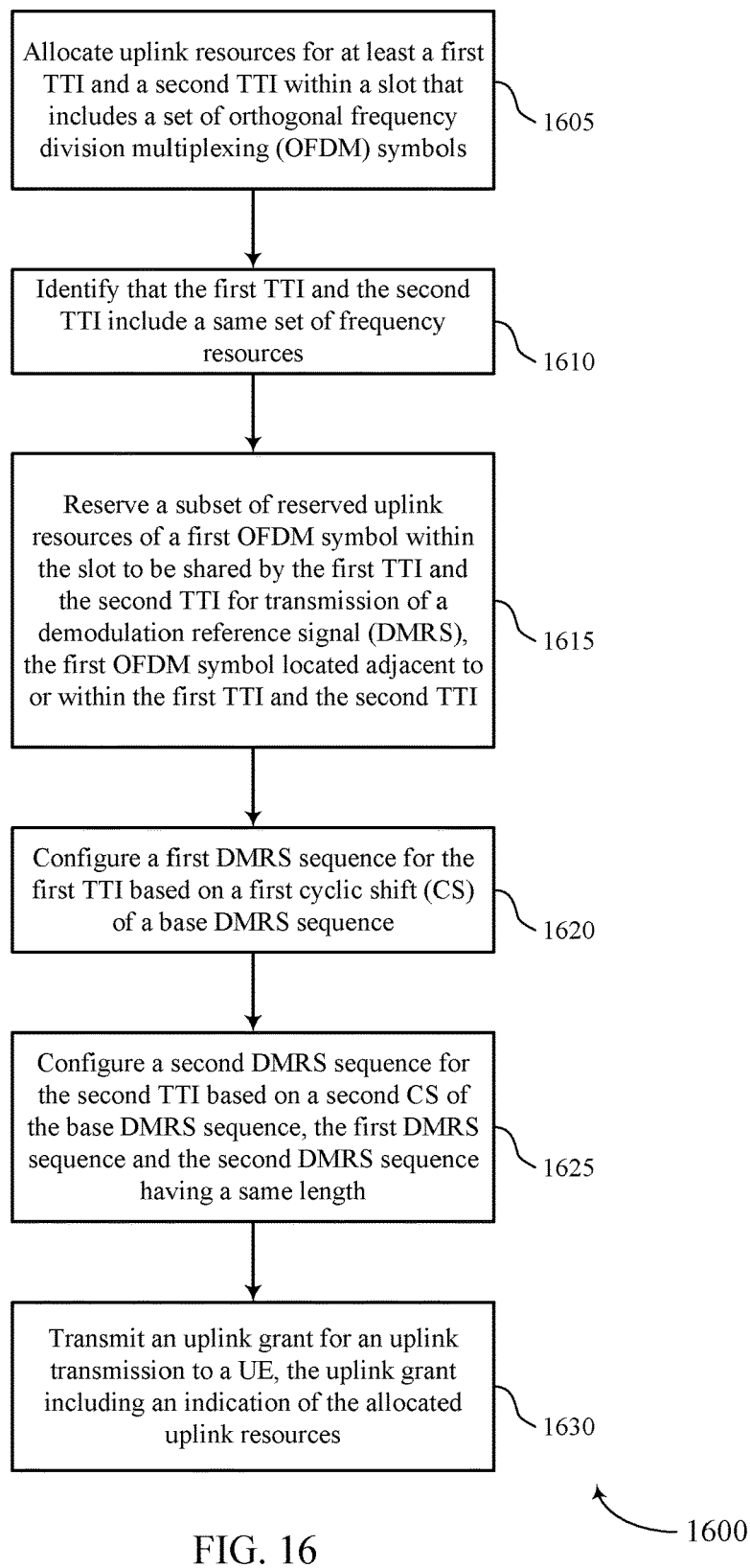

FIG. 16 shows a flowchart illustrating a method 1600 for reference signal pattern and pilot sharing for shortened transmission time interval wireless communications in accordance with various aspects of the present disclosure. The operations of method 1600 may be implemented by a base station 105 or its components as described herein. For example, the operations of method 1600 may be performed by a base station uplink resource manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1605, the base station 105 may allocate uplink resources for at least a first TTI and a second TTI within a slot that comprises a plurality of OFDM symbols. The operations of block 1605 may be performed according to the methods described with reference to FIGS. 1 through 6. In certain examples, aspects of the operations of block 1605 may be performed by a resource allocation component as described with reference to FIGS. 7 through 10.

At block 1610, the base station 105 may identify that the first TTI and the second TTI comprise a same set of frequency resources. The operations of block 1610 may be performed according to the methods described with reference to FIGS. 1 through 6. In certain examples, aspects of the operations of block 1610 may be performed by a resource allocation component as described with reference to FIGS. 7 through 10.

At block 1615, the base station 105 may reserve a subset of reserved uplink resources of a first OFDM symbol within the slot to be shared by the first TTI and the second TTI for transmission of a DMRS, the first OFDM symbol located adjacent to or within the first TTI and the second TTI. The operations of block 1615 may be performed according to the methods described with reference to FIGS. 1 through 6. In certain examples, aspects of the operations of block 1615 may be performed by a DMRS component as described with reference to FIGS. 7 through 10.

At block 1620, the base station 105 may configure a first DMRS sequence for the first TTI based on a first cyclic shift (CS) of a base DMRS sequence. The operations of block 1620 may be performed according to the methods described with reference to FIGS. 1 through 6. In certain examples, aspects of the operations of block 1620 may be performed by a DMRS sequence component as described with reference to FIGS. 7 through 10.

At block 1625, the base station 105 may configure a second DMRS sequence for the second TTI based on a second CS of the base DMRS sequence, the first DMRS sequence and the second DMRS sequence having a same length. The operations of block 1625 may be performed according to the methods described with reference to FIGS. 1 through 6. In certain examples, aspects of the operations of block 1625 may be performed by a DMRS sequence component as described with reference to FIGS. 7 through 10.

At block 1630, the base station 105 may transmit an uplink grant for an uplink transmission to a UE, the uplink grant including an indication of the allocated uplink resources. The operations of block 1630 may be performed according to the methods described with reference to FIGS. 1 through 6. In certain examples, aspects of the operations of block 1630 may be performed by an uplink component as described with reference to FIGS. 7 through 10, which may operate in cooperation with a transmitter 720 or 820 as described with FIG. 7 or 8, or antenna(s) 1040 and transceiver(s) 1035 as described with reference to FIG. 10.

Figure 17:
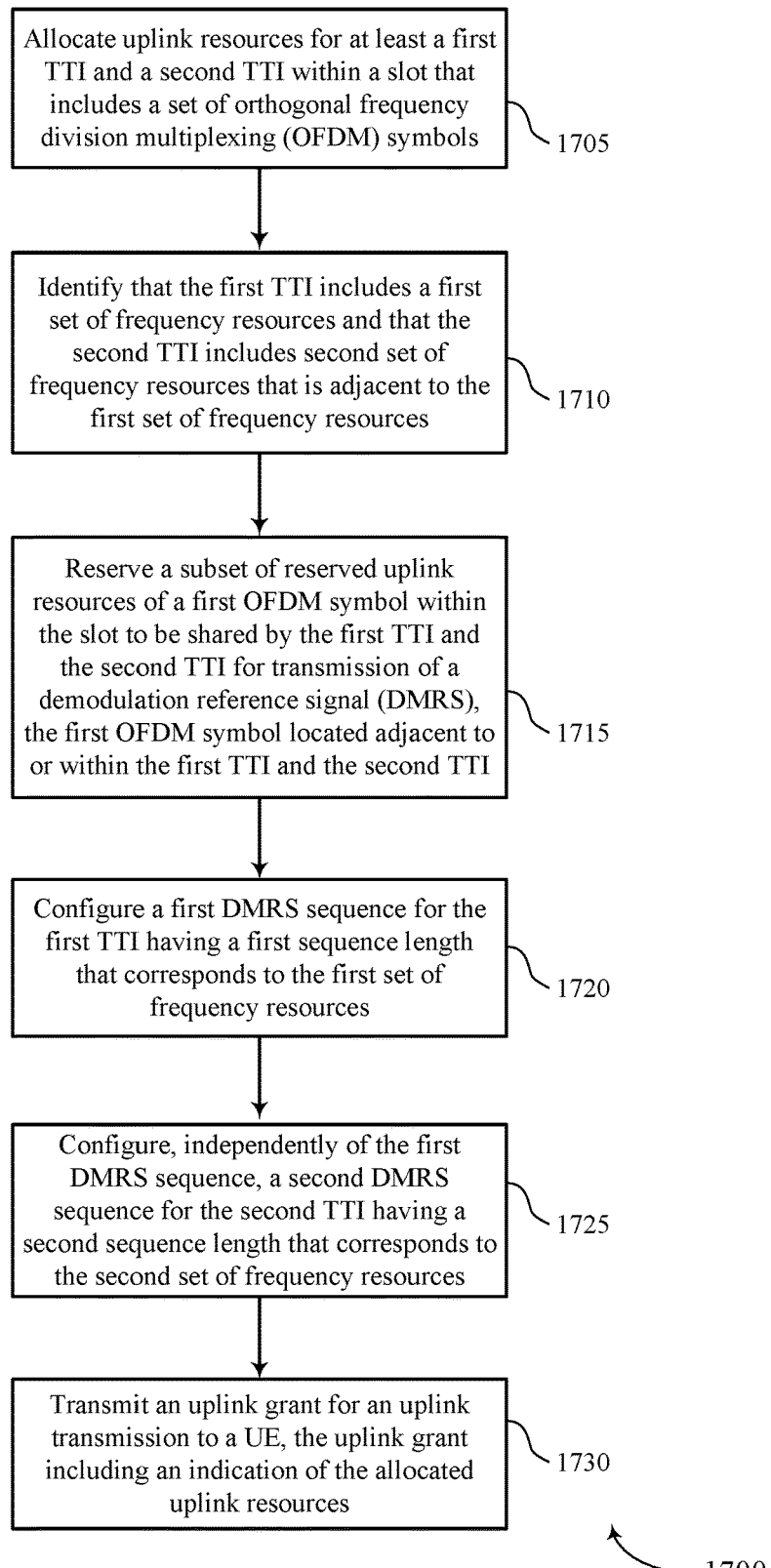

FIG. 17 shows a flowchart illustrating a method 1700 for reference signal pattern and pilot sharing for shortened transmission time interval wireless communications in accordance with various aspects of the present disclosure. The operations of method 1700 may be implemented by a base station 105 or its components as described herein. For example, the operations of method 1700 may be performed by a base station uplink resource manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1705, the base station 105 may allocate uplink resources for at least a first TTI and a second TTI within a slot that comprises a plurality of OFDM symbols. The operations of block 1705 may be performed according to the methods described with reference to FIGS. 1 through 6. In certain examples, aspects of the operations of block 1705 may be performed by a resource allocation component as described with reference to FIGS. 7 through 10.

At block 1710, the base station 105 may identify that the first TTI comprises a first set of frequency resources and that the second TTI comprises second set of frequency resources that is adjacent to the first set of frequency resources. The operations of block 1710 may be performed according to the methods described with reference to FIGS. 1 through 6. In certain examples, aspects of the operations of block 1710 may be performed by a resource allocation component as described with reference to FIGS. 7 through 10.

At block 1715, the base station 105 may reserve a subset of reserved uplink resources of a first OFDM symbol within the slot to be shared by the first TTI and the second TTI for transmission of a DMRS, the first OFDM symbol located adjacent to or within the first TTI and the second TTI. The operations of block 1715 may be performed according to the methods described with reference to FIGS. 1 through 6. In certain examples, aspects of the operations of block 1715 may be performed by a DMRS component as described with reference to FIGS. 7 through 10.

At block 1720, the base station 105 may configure a first DMRS sequence for the first TTI having a first sequence length that corresponds to the first set of frequency resources. The operations of block 1720 may be performed according to the methods described with reference to FIGS. 1 through 6. In certain examples, aspects of the operations of block 1720 may be performed by a DMRS sequence component as described with reference to FIGS. 7 through 10.

At block 1725, the base station 105 may configure, independently of the first DMRS sequence, a second DMRS sequence for the second TTI having a second sequence length that corresponds to the second set of frequency resources. The operations of block 1725 may be performed according to the methods described with reference to FIGS. 1 through 6. In certain examples, aspects of the operations of block 1725 may be performed by a DMRS sequence component as described with reference to FIGS. 7 through 10.

At block 1730, the base station 105 may transmit an uplink grant for an uplink transmission to a UE, the uplink grant including an indication of the allocated uplink resources. The operations of block 1730 may be performed according to the methods described with reference to FIGS. 1 through 6. In certain examples, aspects of the operations of block 1730 may be performed by an uplink grant component as described with reference to FIGS. 7 through 10, which may operate in cooperation with a transmitter 720 or 820 as described with FIG. 7 or 8, or antenna(s) 1040 and transceiver(s) 1035 as described with reference to FIG. 10.

Figure 18:
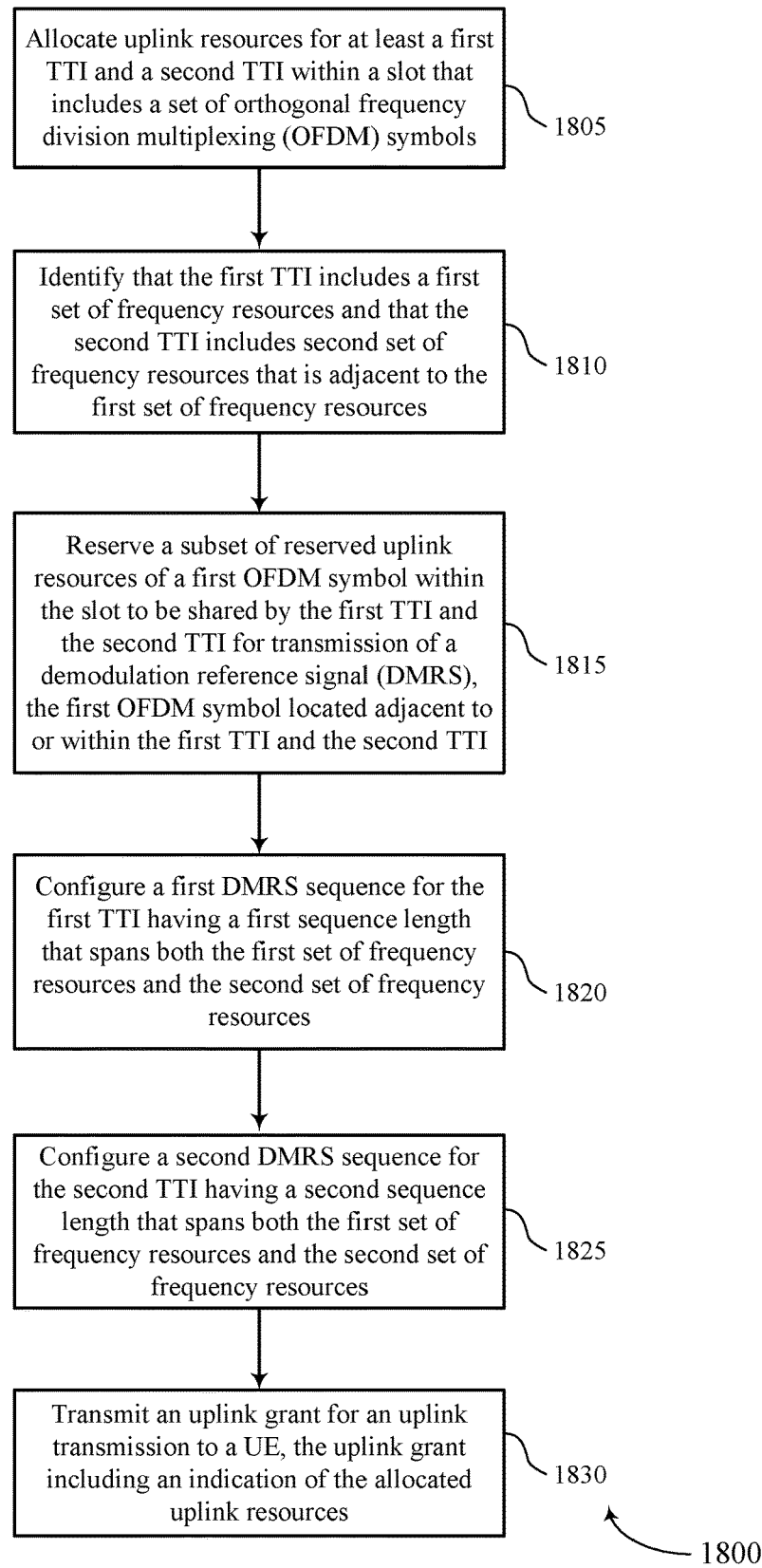

FIG. 18 shows a flowchart illustrating a method 1800 for reference signal pattern and pilot sharing for shortened transmission time interval wireless communications in accordance with various aspects of the present disclosure. The operations of method 1800 may be implemented by a base station 105 or its components as described herein. For example, the operations of method 1800 may be performed by a base station uplink resource manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1805, the base station 105 may allocate uplink resources for at least a first TTI and a second TTI within a slot that comprises a plurality of OFDM symbols. The operations of block 1805 may be performed according to the methods described with reference to FIGS. 1 through 6. In certain examples, aspects of the operations of block 1805 may be performed by a resource allocation component as described with reference to FIGS. 7 through 10.

At block 1810, the base station 105 may identify that the first TTI comprises a first set of frequency resources and that the second TTI comprises second set of frequency resources that is adjacent to the first set of frequency resources. The operations of block 1810 may be performed according to the methods described with reference to FIGS. 1 through 6. In certain examples, aspects of the operations of block 1810 may be performed by a resource allocation component as described with reference to FIGS. 7 through 10.

At block 1815, the base station 105 may reserve a subset of reserved uplink resources of a first OFDM symbol within the slot to be shared by the first TTI and the second TTI for transmission of a DMRS, the first OFDM symbol located adjacent to or within the first TTI and the second TTI. The operations of block 1815 may be performed according to the methods described with reference to FIGS. 1 through 6. In certain examples, aspects of the operations of block 1815 may be performed by a DMRS component as described with reference to FIGS. 7 through 10.

At block 1820, the base station 105 may configure a first DMRS sequence for the first TTI having a first sequence length that spans both the first set of frequency resources and the second set of frequency resources. The operations of block 1820 may be performed according to the methods described with reference to FIGS. 1 through 6. In certain examples, aspects of the operations of block 1820 may be performed by a DMRS sequence component as described with reference to FIGS. 7 through 10.

At block 1825, the base station 105 may configure a second DMRS sequence for the second TTI having a second sequence length that spans both the first set of frequency resources and the second set of frequency resources. The operations of block 1825 may be performed according to the methods described with reference to FIGS. 1 through 6. In certain examples, aspects of the operations of block 1825 may be performed by a DMRS sequence component as described with reference to FIGS. 7 through 10.

At block 1830, the base station 105 may transmit an uplink grant for an uplink transmission to a UE, the uplink grant including an indication of the allocated uplink resources. The operations of block 1830 may be performed according to the methods described with reference to FIGS. 1 through 6. In certain examples, aspects of the operations of block 1830 may be performed by an uplink grant component as described with reference to FIGS. 7 through 10, which may operate in cooperation with a transmitter 720 or 820 as described with FIG. 7 or 8, or antenna(s) 1040 and transceiver(s) 1035 as described with reference to FIG. 10.

Figure 19:
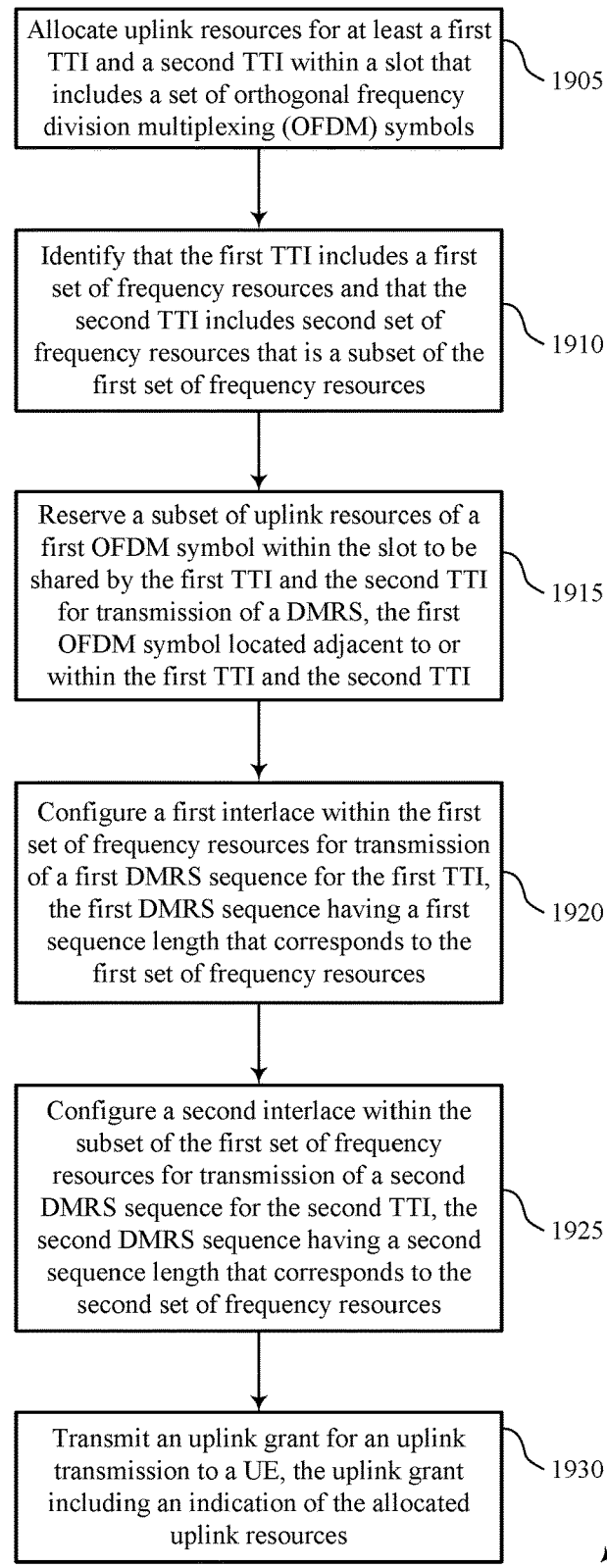

FIG. 19 shows a flowchart illustrating a method 1900 for reference signal pattern and pilot sharing for shortened transmission time interval wireless communications in accordance with various aspects of the present disclosure. The operations of method 1900 may be implemented by a base station 105 or its components as described herein. For example, the operations of method 1900 may be performed by a base station uplink resource manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1905, the base station 105 may allocate uplink resources for at least a first TTI and a second TTI within a slot that comprises a plurality of OFDM symbols. The operations of block 1905 may be performed according to the methods described with reference to FIGS. 1 through 6. In certain examples, aspects of the operations of block 1905 may be performed by a resource allocation component as described with reference to FIGS. 7 through 10.

At block 1910, the base station 105 may identify that the first TTI comprises a first set of frequency resources and that the second TTI comprises second set of frequency resources that is a subset of the first set of frequency resources. The operations of block 1910 may be performed according to the methods described with reference to FIGS. 1 through 6. In certain examples, aspects of the operations of block 1910 may be performed by a resource allocation component as described with reference to FIGS. 7 through 10.

At block 1915, the base station 105 may reserve a subset of reserved uplink resources of a first OFDM symbol within the slot to be shared by the first TTI and the second TTI for transmission of a DMRS, the first OFDM symbol located adjacent to or within the first TTI and the second TTI. The operations of block 1915 may be performed according to the methods described with reference to FIGS. 1 through 6. In certain examples, aspects of the operations of block 1915 may be performed by a DMRS component as described with reference to FIGS. 7 through 10.

At block 1920, the base station 105 may configure a first interlace within the first set of frequency resources for transmission of a first DMRS sequence for the first TTI, the first DMRS sequence having a first sequence length that corresponds to the first set of frequency resources. The operations of block 1920 may be performed according to the methods described with reference to FIGS. 1 through 6. In certain examples, aspects of the operations of block 1920 may be performed by a DMRS interlace component as described with reference to FIGS. 7 through 10.

At block 1925, the base station 105 may configure a second interlace within the subset of the first set of frequency resources for transmission of a second DMRS sequence for the second TTI, the second DMRS sequence having a second sequence length that corresponds to the second set of frequency resources. The operations of block 1925 may be performed according to the methods described with reference to FIGS. 1 through 6. In certain examples, aspects of the operations of block 1925 may be performed by a DMRS interlace component as described with reference to FIGS. 7 through 10.

At block 1930, the base station 105 may transmit an uplink grant for an uplink transmission to a UE, the uplink grant including an indication of the allocated uplink resources. The operations of block 1930 may be performed according to the methods described with reference to FIGS. 1 through 6. In certain examples, aspects of the operations of block 1930 may be performed by an uplink grant component as described with reference to FIGS. 7 through 10, which may operate in cooperation with a transmitter 720 or 820 as described with FIG. 7 or 8, or antenna(s) 1040 and transceiver(s) 1035 as described with reference to FIG. 10.

Figure 20:
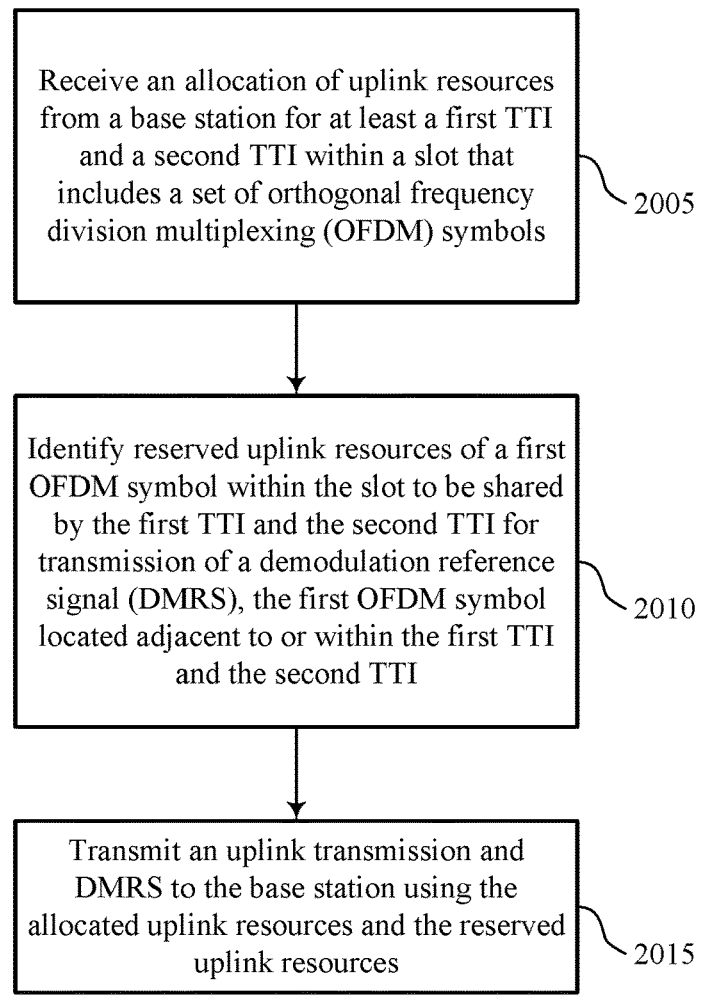

FIG. 20 shows a flowchart illustrating a method 2000 for reference signal pattern and pilot sharing for shortened transmission time interval wireless communications in accordance with various aspects of the present disclosure. The operations of method 2000 may be implemented by a UE 115 or its components as described herein. For example, the operations of method 2000 may be performed by a UE uplink resource manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 2005, the UE 115 may receive an allocation of uplink resources from a base station for at least a first TTI and a second TTI within a slot that comprises a plurality of OFDM symbols. The operations of block 2005 may be performed according to the methods described with reference to FIGS. 1 through 6. In certain examples, aspects of the operations of block 2005 may be performed by a resource allocation component as described with reference to FIGS. 11 through 14, which may operate in cooperation with a receiver 1110 or 1210 as described with FIG. 11 or 12, or antenna(s) 1440 and transceiver(s) 1435 as described with reference to FIG. 14.

At block 2010, the UE 115 may identify reserved uplink resources of a first OFDM symbol within the slot to be shared by the first TTI and the second TTI for transmission of a DMRS, the first OFDM symbol located adjacent to or within the first TTI and the second TTI. The operations of block 2010 may be performed according to the methods described with reference to FIGS. 1 through 6. In certain examples, aspects of the operations of block 2010 may be performed by a DMRS component as described with reference to FIGS. 11 through 14.

At block 2015, the UE 115 may transmit an uplink transmission and DMRS to the base station using the allocated uplink resources and the reserved uplink resources. The operations of block 2015 may be performed according to the methods described with reference to FIGS. 1 through 6. In certain examples, aspects of the operations of block 2015 may be performed by a transmitter as described with reference to FIGS. 11 through 14, which may operate in cooperation with a transmitter 1120 or 1220 as described with FIG. 11 or 12, or antenna(s) 1440 and transceiver(s) 1435 as described with reference to FIG. 14.

Figure 21:
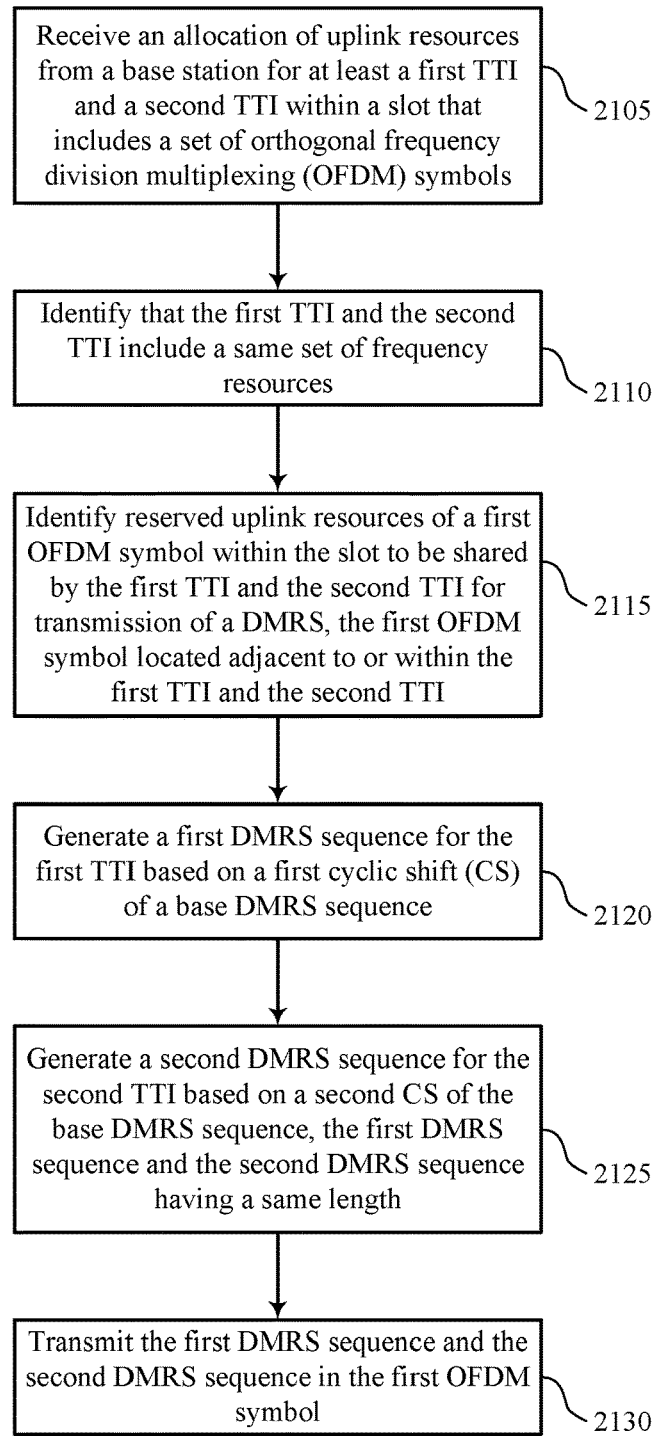

FIG. 21 shows a flowchart illustrating a method 2100 for reference signal pattern and pilot sharing for shortened transmission time interval wireless communications in accordance with various aspects of the present disclosure. The operations of method 2100 may be implemented by a UE 115 or its components as described herein. For example, the operations of method 2100 may be performed by a UE uplink resource manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 2105, the UE 115 may receive an allocation of uplink resources from a base station for at least a first TTI and a second TTI within a slot that comprises a plurality of OFDM symbols. The operations of block 2105 may be performed according to the methods described with reference to FIGS. 1 through 6. In certain examples, aspects of the operations of block 2105 may be performed by a resource allocation component as described with reference to FIGS. 11 through 14, which may operate in cooperation with a receiver 1110 or 1210 as described with FIG. 11 or 12, or antenna(s) 1440 and transceiver(s) 1435 as described with reference to FIG. 14.

At block 2110, the UE 115 may identify that the first TTI and the second TTI comprise a same set of frequency resources. The operations of block 2110 may be performed according to the methods described with reference to FIGS. 1 through 6. In certain examples, aspects of the operations of block 2110 may be performed by a resource allocation component as described with reference to FIGS. 11 through 14.

At block 2115, the UE 115 may identify reserved uplink resources of a first OFDM symbol within the slot to be shared by the first TTI and the second TTI for transmission of a DMRS, the first OFDM symbol located adjacent to or within the first TTI and the second TTI. The operations of block 2115 may be performed according to the methods described with reference to FIGS. 1 through 6. In certain examples, aspects of the operations of block 2115 may be performed by a DMRS component as described with reference to FIGS. 11 through 14.

At block 2120, the UE 115 may generate a first DMRS sequence for the first TTI based on a first CS of a base DMRS sequence. The operations of block 2120 may be performed according to the methods described with reference to FIGS. 1 through 6. In certain examples, aspects of the operations of block 2120 may be performed by a DMRS sequence component as described with reference to FIGS. 11 through 14.

At block 2125, the UE 115 may generate a second DMRS sequence for the second TTI based on a second CS of the base DMRS sequence, the first DMRS sequence and the second DMRS sequence having a same length. The operations of block 2125 may be performed according to the methods described with reference to FIGS. 1 through 6. In certain examples, aspects of the operations of block 2125 may be performed by a DMRS sequence component as described with reference to FIGS. 11 through 14.

At block 2130, the UE 115 may transmit the first DMRS sequence and the second DMRS sequence in the first OFDM symbol. The operations of block 2130 may be performed according to the methods described with reference to FIGS. 1 through 6. In certain examples, aspects of the operations of block 2130 may be performed by a transmitter as described with reference to FIGS. 11 through 14, which may operate in cooperation with a transmitter 1120 or 1220 as described with FIG. 11 or 12, or antenna(s) 1440 and transceiver(s) 1435 as described with reference to FIG. 14.

Figure 22:
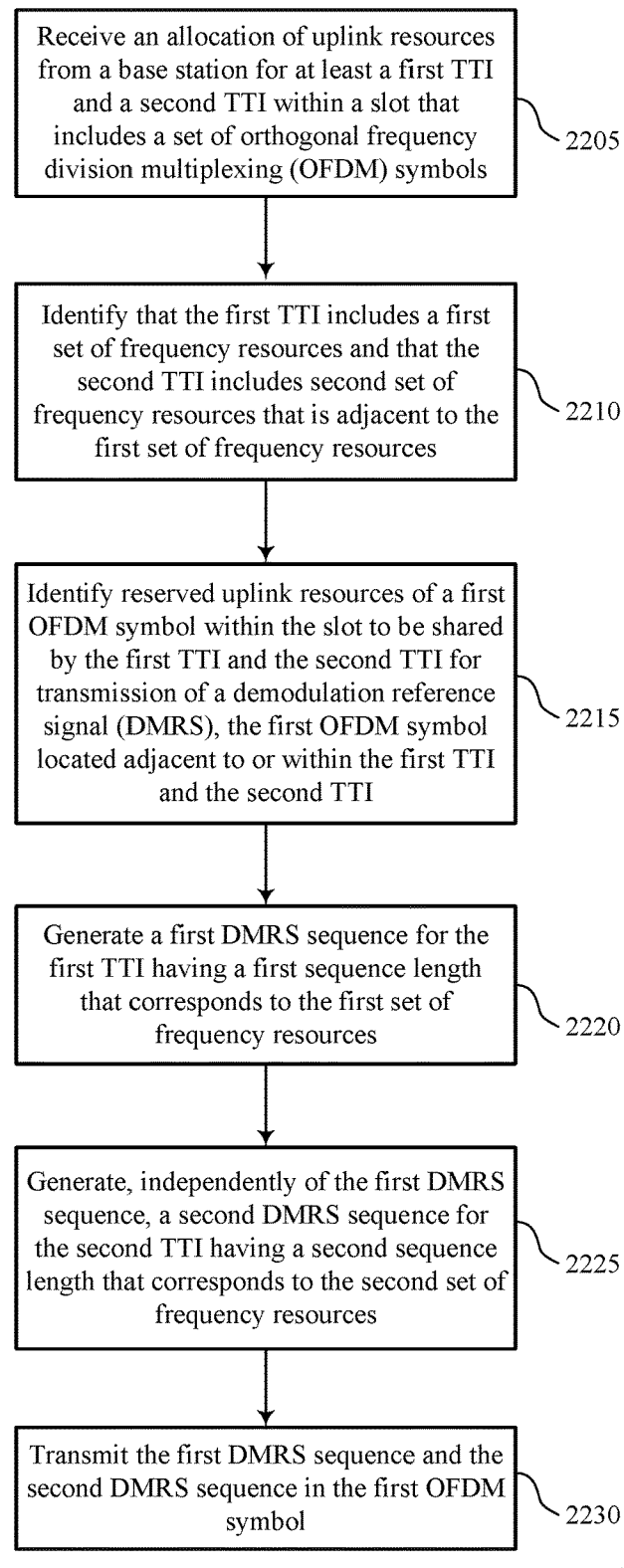

FIG. 22 shows a flowchart illustrating a method 2200 for reference signal pattern and pilot sharing for shortened transmission time interval wireless communications in accordance with various aspects of the present disclosure. The operations of method 2200 may be implemented by a UE 115 or its components as described herein. For example, the operations of method 2200 may be performed by a UE uplink resource manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 2205, the UE 115 may receive an allocation of uplink resources from a base station for at least a first TTI and a second TTI within a slot that comprises a plurality of OFDM symbols. The operations of block 2205 may be performed according to the methods described with reference to FIGS. 1 through 6. In certain examples, aspects of the operations of block 2205 may be performed by a resource allocation component as described with reference to FIGS. 11 through 14, which may operate in cooperation with a receiver 1110 or 1210 as described with FIG. 11 or 12, or antenna(s) 1440 and transceiver(s) 1435 as described with reference to FIG. 14.

At block 2210, the UE 115 may identify that the first TTI comprises a first set of frequency resources and that the second TTI comprises second set of frequency resources that is adjacent to the first set of frequency resources. The operations of block 2210 may be performed according to the methods described with reference to FIGS. 1 through 6. In certain examples, aspects of the operations of block 2210 may be performed by a resource allocation component as described with reference to FIGS. 11 through 14.

At block 2215, the UE 115 may identify reserved uplink resources of a first OFDM symbol within the slot to be shared by the first TTI and the second TTI for transmission of a DMRS, the first OFDM symbol located adjacent to or within the first TTI and the second TTI. The operations of block 2215 may be performed according to the methods described with reference to FIGS. 1 through 6. In certain examples, aspects of the operations of block 2215 may be performed by a DMRS component as described with reference to FIGS. 11 through 14.

At block 2220, the UE 115 may generate a first DMRS sequence for the first TTI having a first sequence length that corresponds to the first set of frequency resources. The operations of block 2220 may be performed according to the methods described with reference to FIGS. 1 through 6. In certain examples, aspects of the operations of block 2220 may be performed by a DMRS sequence component as described with reference to FIGS. 11 through 14.

At block 2225, the UE 115 may generate, independently of the first DMRS sequence, a second DMRS sequence for the second TTI having a second sequence length that corresponds to the second set of frequency resources. The operations of block 2225 may be performed according to the methods described with reference to FIGS. 1 through 6. In certain examples, aspects of the operations of block 2225 may be performed by a DMRS sequence component as described with reference to FIGS. 11 through 14.

At block 2230, the UE 115 may transmit the first DMRS sequence and the second DMRS sequence in the first OFDM symbol. The operations of block 2230 may be performed according to the methods described with reference to FIGS.

1 through 6. In certain examples, aspects of the operations of block 2230 may be performed by a transmitter as described with reference to FIGS. 11 through 14, which may operate in cooperation with a transmitter 1120 or 1220 as described with FIG. 11 or 12, or antenna(s) 1440 and transceiver(s) 1435 as described with reference to FIG. 14.

Figure 23:
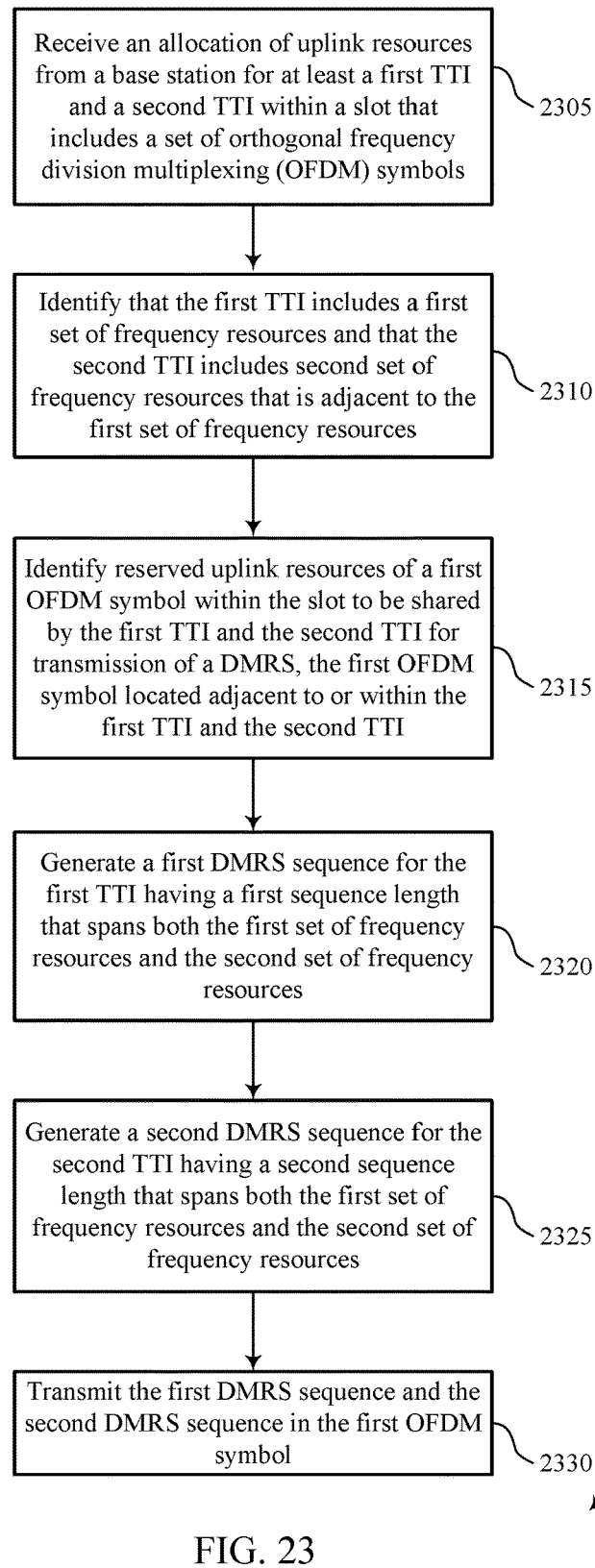

FIG. 23 shows a flowchart illustrating a method 2300 for reference signal pattern and pilot sharing for shortened transmission time interval wireless communications in accordance with various aspects of the present disclosure. The operations of method 2300 may be implemented by a UE 115 or its components as described herein. For example, the operations of method 2300 may be performed by a UE uplink resource manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 2305, the UE 115 may receive an allocation of uplink resources from a base station for at least a first TTI and a second TTI within a slot that comprises a plurality of OFDM symbols. The operations of block 2305 may be performed according to the methods described with reference to FIGS. 1 through 6. In certain examples, aspects of the operations of block 2305 may be performed by a resource allocation component as described with reference to FIGS. 11 through 14, which may operate in cooperation with a receiver 1110 or 1210 as described with FIG. 11 or 12, or antenna(s) 1440 and transceiver(s) 1435 as described with reference to FIG. 14.

At block 2310, the UE 115 may identify that the first TTI comprises a first set of frequency resources and that the second TTI comprises second set of frequency resources that is adjacent to the first set of frequency resources. The operations of block 2310 may be performed according to the methods described with reference to FIGS. 1 through 6. In certain examples, aspects of the operations of block 2310 may be performed by a resource allocation component as described with reference to FIGS. 11 through 14.

At block 2315, the UE 115 may identify reserved uplink resources of a first OFDM symbol within the slot to be shared by the first TTI and the second TTI for transmission of a DMRS, the first OFDM symbol located adjacent to or within the first TTI and the second TTI. The operations of block 2315 may be performed according to the methods described with reference to FIGS. 1 through 6. In certain examples, aspects of the operations of block 2315 may be performed by a DMRS component as described with reference to FIGS. 11 through 14.

At block 2320, the UE 115 may generate a first DMRS sequence for the first TTI having a first sequence length that spans both the first set of frequency resources and the second set of frequency resources. The operations of block 2320 may be performed according to the methods described with reference to FIGS. 1 through 6. In certain examples, aspects of the operations of block 2320 may be performed by a DMRS sequence component as described with reference to FIGS. 11 through 14.

At block 2325, the UE 115 may generate a second DMRS sequence for the second TTI having a second sequence length that spans both the first set of frequency resources and the second set of frequency resources. The operations of block 2325 may be performed according to the methods described with reference to FIGS. 1 through 6. In certain examples, aspects of the operations of block 2325 may be performed by a DMRS sequence component as described with reference to FIGS. 11 through 14.

At block 2330, the UE 115 may transmit the first DMRS sequence and the second DMRS sequence in the first OFDM symbol. The operations of block 2330 may be performed according to the methods described with reference to FIGS. 1 through 6. In certain examples, aspects of the operations of block 2330 may be performed by a transmitter as described with reference to FIGS. 11 through 14, which may operate in cooperation with a transmitter 1120 or 1220 as described with FIG. 11 or 12, or antenna(s) 1440 and transceiver(s) 1435 as described with reference to FIG. 14.

Figure 24:
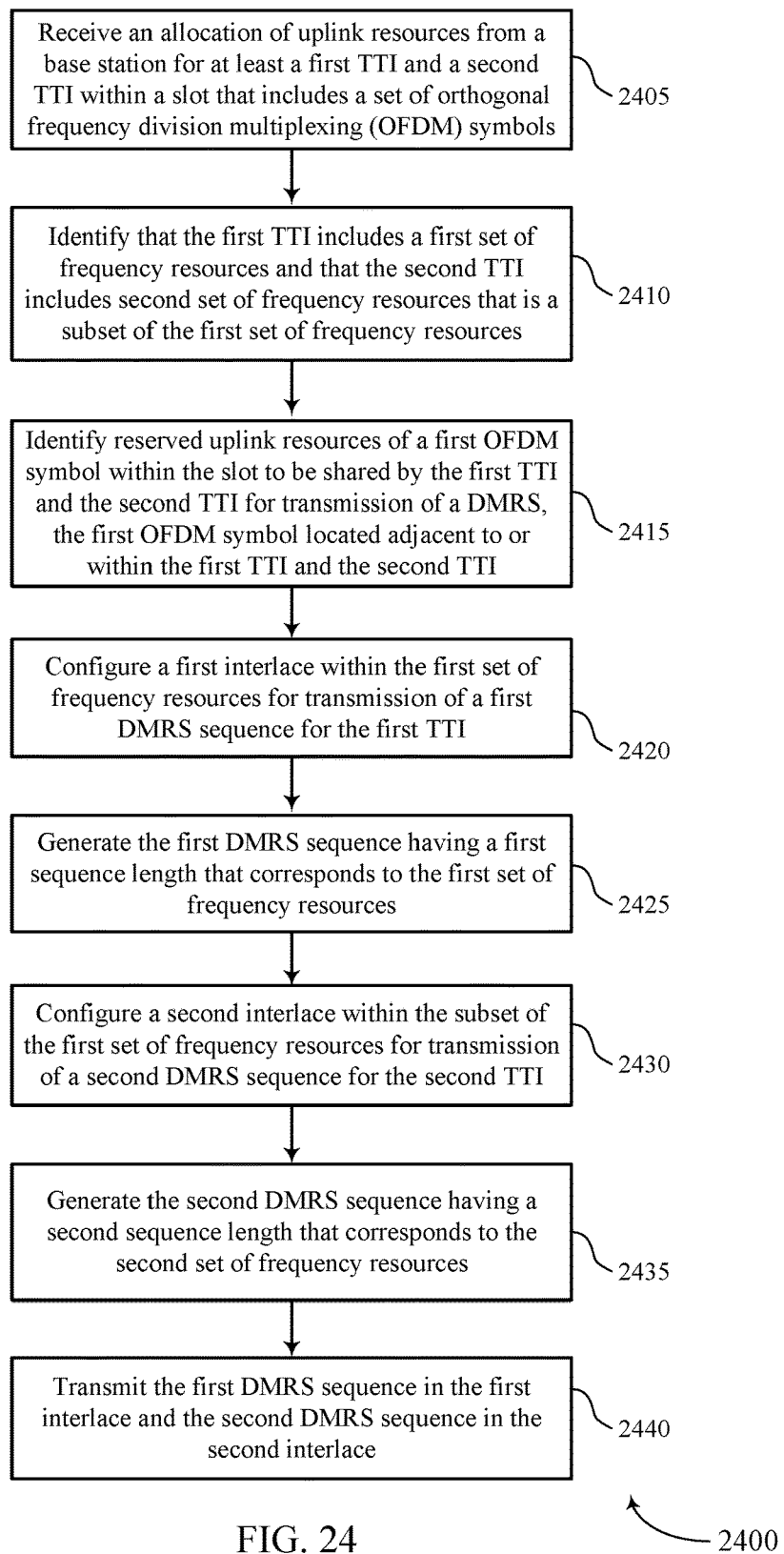

FIG. 24 shows a flowchart illustrating a method 2400 for reference signal pattern and pilot sharing for shortened transmission time interval wireless communications in accordance with various aspects of the present disclosure. The operations of method 2400 may be implemented by a UE 115 or its components as described herein. For example, the operations of method 2400 may be performed by a UE uplink resource manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 2405, the UE 115 may receive an allocation of uplink resources from a base station for at least a first TTI and a second TTI within a slot that comprises a plurality of OFDM symbols. The operations of block 2405 may be performed according to the methods described with reference to FIGS. 1 through 6. In certain examples, aspects of the operations of block 2405 may be performed by a resource allocation component as described with reference to FIGS. 11 through 14, which may operate in cooperation with a receiver 1110 or 1210 as described with FIG. 11 or 12, or antenna(s) 1440 and transceiver(s) 1435 as described with reference to FIG. 14.

At block 2410, the UE 115 may identify that the first TTI comprises a first set of frequency resources and that the second TTI comprises second set of frequency resources that is a subset of the first set of frequency resources. The operations of block 2410 may be performed according to the methods described with reference to FIGS. 1 through 6. In certain examples, aspects of the operations of block 2410 may be performed by a resource allocation component as described with reference to FIGS. 11 through 14.

At block 2415, the UE 115 may identify reserved uplink resources of a first OFDM symbol within the slot to be shared by the first TTI and the second TTI for transmission of a DMRS, the first OFDM symbol located adjacent to or within the first TTI and the second TTI. The operations of block 2415 may be performed according to the methods described with reference to FIGS. 1 through 6. In certain examples, aspects of the operations of block 2415 may be performed by a DMRS component as described with reference to FIGS. 11 through 14.

At block 2420, the UE 115 may configure a first interlace within the first set of frequency resources for transmission of a first DMRS sequence for the first TTI. The operations of block 2420 may be performed according to the methods described with reference to FIGS. 1 through 6. In certain examples, aspects of the operations of block 2420 may be performed by a DMRS interlace component as described with reference to FIGS. 11 through 14.

At block 2425, the UE 115 may generate the first DMRS sequence having a first sequence length that corresponds to the first set of frequency resources. The operations of block 2425 may be performed according to the methods described with reference to FIGS. 1 through 6. In certain examples, aspects of the operations of block 2425 may be performed by a DMRS sequence component as described with reference to FIGS. 11 through 14.

At block 2430, the UE 115 may configure a second interlace within the subset of the first set of frequency resources for transmission of a second DMRS sequence for the second TTI. The operations of block 2430 may be performed according to the methods described with reference to FIGS. 1 through 6. In certain examples, aspects of the operations of block 2430 may be performed by a DMRS interlace component as described with reference to FIGS. 11 through 14.

At block 2435, the UE 115 may generate the second DMRS sequence having a second sequence length that corresponds to the second set of frequency resources. The operations of block 2435 may be performed according to the methods described with reference to FIGS. 1 through 6. In certain examples, aspects of the operations of block 2435 may be performed by a DMRS sequence component as described with reference to FIGS. 11 through 14.

At block 2440, the UE 115 may transmit the first DMRS sequence in the first interlace and the second DMRS sequence in the second interlace. The operations of block 2440 may be performed according to the methods described with reference to FIGS. 1 through 6. In certain examples, aspects of the operations of block 2440 may be performed by a transmitter as described with reference to FIGS. 11 through 14, which may operate in cooperation with a transmitter 1120 or 1220 as described with FIG. 11 or 12, or antenna(s) 1440 and transceiver(s) 1435 as described with reference to FIG. 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   allocating uplink resources for at least a first transmission time interval (TTI) and a second TTI within a slot that comprises a plurality of orthogonal frequency division multiplexing (OFDM) symbols;
   reserving a subset of reserved uplink resources of a first OFDM symbol within the slot to be shared by the first TTI and the second TTI for transmission of a demodulation reference signal (DMRS), the shared first OFDM symbol located adjacent to or within the first TTI and the second TTI; and transmitting an uplink grant for an uplink transmission to a user equipment (UE), the uplink grant including an indication of the allocated uplink resources.

2. The method of claim 1, further comprising:
identifying that the first TTI and the second TTI comprise a same set of frequency resources;
configuring a first DMRS sequence for the first TTI based on a first cyclic shift (CS) of a base DMRS sequence; and
configuring a second DMRS sequence for the second TTI based on a second CS of the base DMRS sequence, the first DMRS sequence and the second DMRS sequence having a same length.

3. The method of claim 1, further comprising:
identifying that the first TTI comprises a first set of frequency resources and that the second TTI comprises second set of frequency resources that is adjacent to the first set of frequency resources.

4. The method of claim 1, further comprising:
identifying that the first TTI comprises a first set of frequency resources and that the second TTI comprises second set of frequency resources that is a subset of the first set of frequency resources.

5. The method of claim 4, further comprising:
configuring a first interlace within the first set of frequency resources for transmission of a first DMRS sequence for the first TTI, the first DMRS sequence having a first sequence length that corresponds to the first set of frequency resources; and
configuring a second interlace within the subset of the first set of frequency resources for transmission of a second DMRS sequence for the second TTI, the second DMRS sequence having a second sequence length that corresponds to the second set of frequency resources.

6. The method of claim 1, further comprising:
identifying that the first TTI comprises a first set of frequency resources and that the second TTI comprises second set of frequency resources that partially overlaps the first set of frequency resources.

7. The method of claim 4, further comprising:
configuring a first interlace within the first set of frequency resources and the second set of frequency resources for transmission of a first DMRS sequence for the first TTI; and
configuring a second interlace within the first set of frequency resources and the second set of frequency resources for transmission of a second DMRS sequence for the second TTI.

8. The method of claim 1, further comprising:
identifying that the first TTI comprises a first set of frequency resources and that the second TTI comprises second set of frequency resources that is non-adjacent to and non-overlapping with the first set of frequency resources.

9. The method of claim 1, further comprising:
identifying that the first TTI has three OFDM symbols and the second TTI has three OFDM symbols, and wherein the first OFDM symbol is shared between the first TTI and the second TTI.

10. The method of claim 1, wherein the allocated uplink resources include resources for a third TTI that includes two OFDM symbols that are non-adjacent to the first OFDM symbol, and wherein the method further comprises:
identifying a DMRS resource for the third TTI.

11. A method for wireless communication, comprising:
receiving an allocation of uplink resources from a base station for at least a first transmission time interval (TTI) and a second TTI within a slot that comprises a plurality of orthogonal frequency division multiplexing (OFDM) symbols;
identifying reserved uplink resources of a first OFDM symbol within the slot to be shared by the first TTI and the second TTI for transmission of a demodulation reference signal (DMRS), the shared first OFDM symbol located adjacent to or within the first TTI and the second TTI; and
transmitting an uplink transmission and DMRS to the base station using the allocated uplink resources and the reserved uplink resources.

12. The method of claim 11, further comprising:
identifying that the first TTI and the second TTI comprise a same set of frequency resources;
generating a first DMRS sequence for the first TTI based on a first cyclic shift (CS) of a base DMRS sequence;
generating a second DMRS sequence for the second TTI based on a second CS of the base DMRS sequence, the first DMRS sequence and the second DMRS sequence having a same length; and
transmitting the first DMRS sequence and the second DMRS sequence in the first OFDM symbol.

13. The method of claim 11, further comprising:
identifying that the first TTI comprises a first set of frequency resources and that the second TTI comprises second set of frequency resources that is adjacent to the first set of frequency resources.

14. The method of claim 13, further comprising:
generating a first DMRS sequence for the first TTI having a first sequence length that corresponds to the first set of frequency resources;
generating, independently of the first DMRS sequence, a second DMRS sequence for the second TTI having a second sequence length that corresponds to the second set of frequency resources; and
transmitting the first DMRS sequence and the second DMRS sequence in the first OFDM symbol.

15. The method of claim 13, further comprising:
generating a first DMRS sequence for the first TTI having a first sequence length that spans both the first set of frequency resources and the second set of frequency resources;
generating a second DMRS sequence for the second TTI having a second sequence length that spans both the first set of frequency resources and the second set of frequency resources; and
transmitting the first DMRS sequence and the second DMRS sequence in the first OFDM symbol.

16. The method of claim 11, further comprising:
identifying that the first TTI comprises a first set of frequency resources and that the second TTI comprises second set of frequency resources that is a subset of the first set of frequency resources.

17. The method of claim 16, further comprising:
configuring a first interlace within the first set of frequency resources for transmission of a first DMRS sequence for the first TTI;
generating the first DMRS sequence having a first sequence length that corresponds to the first set of frequency resources;
configuring a second interlace within the subset of the first set of frequency resources for transmission of a second DMRS sequence for the second TTI;
generating the second DMRS sequence having a second sequence length that corresponds to the second set of frequency resources; and transmitting the first DMRS sequence in the first interlace and the second DMRS sequence in the second interlace.

18. The method of claim 11, further comprising:
identifying that the first TTI comprises a first set of frequency resources and that the second TTI comprised second set of frequency resources that is non-adjacent to and non-overlapping with the first set of frequency resources;
generating a first DMRS sequence for the first TTI having a first sequence length that corresponds to the first set of frequency resources;
generating, independently of the first DMRS sequence, a second DMRS sequence for the second TTI having a second sequence length that corresponds to the second set of frequency resources that is non-adjacent to and non-overlapping with the first set of frequency resources; and
transmitting the first DMRS sequence in the first set of frequency resources and the second DMRS sequence in the second set of frequency resources.

19. The method of claim 11, further comprising:
identifying that the first TTI that has three OFDM symbols and the second TTI that has three OFDM symbols, and wherein the first OFDM symbol is shared between the first TTI and the second TTI.

20. The method of claim 19, wherein one or more of the first TTI or the second TTI includes, in addition to the first OFDM symbol, two data OFDM symbols or one data OFDM symbol and one pilot OFDM symbol.

21. The method of claim 11, wherein the allocation of uplink resources further comprises uplink resources for a third TTI that includes two OFDM symbols that are non-adjacent to the first OFDM symbol.

22. The method of claim 21, further comprising:
receiving signaling indicating a DMRS resource for the third TTI.

23. An apparatus for wireless communication, in a system comprising:
a processor;
memory in electronic communication with the processor; and
instructions stored in the memory and operable, when executed by the processor, to cause the apparatus to:
allocate uplink resources for at least a first transmission time interval (TTI) and a second TTI within a slot that comprises a plurality of orthogonal frequency division multiplexing (OFDM) symbols;
reserve a subset of reserved uplink resources of a first OFDM symbol within the slot to be shared by the first TTI and the second TTI for transmission of a demodulation reference signal (DMRS), the shared first OFDM symbol located adjacent to or within the first TTI and the second TTI; and
transmit an uplink grant for an uplink transmission to a user equipment (UE), the uplink grant including an indication of the allocated uplink resources.

24. The apparatus of claim 23, wherein the instructions are operable to cause the apparatus to:
identify that the first TTI comprises a first set of frequency resources and that the second TTI comprises second set of frequency resources that is a subset of the first set of frequency resources.

25. The apparatus of claim 24, wherein the instructions are operable to cause the apparatus to:
configure a first interlace within the first set of frequency resources for transmission of a first DMRS sequence for the first TTI, the first DMRS sequence having a first sequence length that corresponds to the first set of frequency resources; and
configure a second interlace within the subset of the first set of frequency resources for transmission of a second DMRS sequence for the second TTI, the second DMRS sequence having a second sequence length that corresponds to the second set of frequency resources.

26. The apparatus of claim 24, wherein the instructions are operable to cause the apparatus to:
configure a first interlace within the first set of frequency resources and the second set of frequency resources for transmission of a first DMRS sequence for the first TTI; and
configure a second interlace within the first set of frequency resources and the second set of frequency resources for transmission of a second DMRS sequence for the second TTI.

27. An apparatus for wireless communication, in a system comprising:
a processor;
memory in electronic communication with the processor; and
instructions stored in the memory and operable, when executed by the processor, to cause the apparatus to:
receive an allocation of uplink resources from a base station for at least a first transmission time interval (TTI) and a second TTI within a slot that comprises a plurality of orthogonal frequency division multiplexing (OFDM) symbols;
identify reserved uplink resources of a first OFDM symbol within the slot to be shared by the first TTI and the second TTI for transmission of a demodulation reference signal (DMRS), the shared first OFDM symbol located adjacent to or within the first TTI and the second TTI; and
transmit an uplink transmission and DMRS to the base station using the allocated uplink resources and the reserved uplink resources.

28. The apparatus of claim 27, wherein the instructions are operable to cause the apparatus to:
identify that the first TTI and the second TTI comprise a same set of frequency resources;
generate a first DMRS sequence for the first TTI based on a first cyclic shift (CS) of a base DMRS sequence;
generate a second DMRS sequence for the second TTI based on a second CS of the base DMRS sequence, the first DMRS sequence and the second DMRS sequence having a same length; and
transmit the first DMRS sequence and the second DMRS sequence in the first OFDM symbol.

29. The apparatus of claim 27, wherein the instructions are operable to cause the apparatus to:
identify that the first TTI comprises a first set of frequency resources and that the second TTI comprises second set of frequency resources that is a subset of the first set of frequency resources.

30. The apparatus of claim 29, wherein the instructions are operable to cause the apparatus to:
configure a first interlace within the first set of frequency resources for transmission of a first DMRS sequence for the first TTI;
generate the first DMRS sequence having a first sequence length that corresponds to the first set of frequency resources;

configure a second interlace within the subset of the first set of frequency resources for transmission of a second DMRS sequence for the second TTI;
generate the second DMRS sequence having a second sequence length that corresponds to the second set of frequency resources; and
transmit the first DMRS sequence in the first interlace and the second DMRS sequence in the second interlace.

* * * * *